US012382338B2

(12) United States Patent
Oh et al.

(10) Patent No.: US 12,382,338 B2
(45) Date of Patent: Aug. 5, 2025

(54) METHOD AND DEVICE FOR TERMINAL AND BASE STATION TO TRANSMIT AND RECEIVE SIGNALS IN WIRELESS COMMUNICATION SYSTEM

(71) Applicant: LG ELECTRONICS INC., Seoul (KR)

(72) Inventors: Jaeky Oh, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 18/002,388

(22) PCT Filed: Jul. 14, 2020

(86) PCT No.: PCT/KR2020/009257
§ 371 (c)(1),
(2) Date: Dec. 19, 2022

(87) PCT Pub. No.: WO2022/014735
PCT Pub. Date: Jan. 20, 2022

(65) Prior Publication Data
US 2023/0232278 A1    Jul. 20, 2023

(51) Int. Cl.
*H04W 28/06*    (2009.01)
*H04W 48/08*    (2009.01)
*H04W 74/0833*    (2024.01)

(52) U.S. Cl.
CPC .......... *H04W 28/06* (2013.01); *H04W 48/08* (2013.01); *H04W 74/0833* (2013.01)

(58) Field of Classification Search
CPC . H04W 28/06; H04W 48/08; H04W 74/0833; H04W 28/18; H04W 72/0446; G06N 20/00; G06N 20/20; H04L 1/00; H04L 5/005; H04J 11/0073; H04J 11/0076
See application file for complete search history.

(56) References Cited

U.S. PATENT DOCUMENTS

2017/0318591 A1    11/2017    Tercero Vargas et al.

FOREIGN PATENT DOCUMENTS

| EP | 3110034 A1 * | 12/2016 | ........... H04B 7/2656 |
| KR | 10-2004-0017282 | 2/2004 | |
| KR | 10-0962150 | 6/2010 | |
| WO | 2009-043215 | 4/2009 | |
| WO | WO-2020198645 A1 * | 10/2020 | ........... H04L 1/1858 |

OTHER PUBLICATIONS

Yin et al., "FedLoc: Federated Learning Framework for Data-Driven Cooperative Localization and Location Data Processing," arXiv:2003.03697, May 2020, 29 pages.

* cited by examiner

*Primary Examiner* — Thai Nguyen
(74) *Attorney, Agent, or Firm* — LEE, HONG, DEGERMAN, KANG & WAIMEY

(57) ABSTRACT

The present discloses a method for operating a base station in a wireless communication system, the method comprising: transmitting a first global parameter to a plurality of terminals; determining a transmission scheme which is used by the plurality of terminals; transmitting the determined transmission scheme to the plurality of terminals; receiving, based on the determined transmission scheme, information on a local model parameter from the plurality of terminals; and updating the first global parameter to a second global parameter.

14 Claims, 35 Drawing Sheets

(control plane)

(user plane)

METHOD AND DEVICE FOR TERMINAL AND BASE STATION TO TRANSMIT AND RECEIVE SIGNALS IN WIRELESS COMMUNICATION SYSTEM

CROSS-REFERENCE TO RELATED APPLICATION(S)

This application is the National Stage filing under 35 U.S.C. 371 of International Application No. PCT/KR2020/009257, filed on Jul. 14, 2020, the contents of which is hereby incorporated by reference herein in its entirety.

TECHNICAL FIELD

The present disclosure relates to a wireless communication system, and more particularly, to a method and apparatus for a terminal and a base station to transmit and receive a signal in a wireless communication system.

In particular, the present disclosure may provide a method and device for a terminal and a base station to transmit and receive a signal based on an adaptive federated learning transmission technique.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure relates to a method for a terminal and a base station to transmit and receive a signal in a wireless communication system.

The technical objects to be achieved in the present disclosure are not limited to the above-mentioned technical objects, and other technical objects that are not mentioned may be considered by those skilled in the art through the embodiments described below.

The present disclosure a method for operating a base station in a wireless communication system, the method comprising: transmitting a first global parameter to a plurality of terminals; determining a transmission scheme which is used by the plurality of terminals; transmitting the determined transmission scheme to the plurality of terminals; receiving, based on the determined transmission scheme, information on a local model parameter from the plurality of terminals; and updating the first global parameter to a second global parameter.

The present disclosure a base station operating in a wireless communication system, the base station comprising: at least one transmitter; at least one receiver; at least one processor; and at least one memory that is coupled with the at least one processor in an operable manner and stores instructions which, when being executed, make the at least one processor perform a specific operation, wherein the specific operation is configured to: transmit a first global parameter to a plurality of terminals, determine a transmission scheme that is used by the plurality of terminals, transmit information on the determined transmission scheme to the plurality of terminals, receive information on a local model parameter from the plurality of terminals based on the determined transmission scheme, and update the first global parameter to a second global parameter.

In addition, the following discloses are commonly applied to a method and apparatus for transmitting and receiving signals of a terminal and a base station to which the present disclosure is applied.

The present disclosure the method, the method further comprising: requesting local model parameter compression size information to the plurality of terminals; and receiving the local model parameter compression size information from the plurality of terminals based on the request.

The present disclosure the base station checks an aggregate total of local model parameter compression sizes for the plurality of terminals based on the local model parameter compression size information received from each of the plurality of terminals, and wherein the base station compares the aggregate total of local model parameter compression sizes for the plurality of terminals with a size based on AirComp.

The present disclosure, based on the aggregate total of local model parameter compression sizes for the plurality of terminals being larger than the size based on AirComp, the base station determines an AirComp transmission scheme as a transmission scheme that is used by the plurality of terminals.

The present disclosure the, based on the plurality of terminals transmitting the local model parameter based on the AirComp transmission scheme, each of the plurality of terminals transmits the local model parameter to the base station at a same time slot.

The present disclosure the base station identifies the local model parameter that is transmitted from each of the plurality of terminals based on a superposition scheme.

The present disclosure the, based on the aggregate total of local model parameter compression sizes for the plurality of terminals being equal to or smaller than the size based on AirComp, the base station determines a compression transmission scheme as a transmission scheme that is used by the plurality of terminals.

The present disclosure the, based on the plurality of terminals transmitting the local model parameter based on the compression transmission scheme, each of the plurality of terminals compresses the local model parameter, and wherein the each of the plurality of terminals transmits the compressed local model parameter to the base station through a resource that is allocated to the each of the plurality of terminals.

The present disclosure the base station decompresses each of the compressed local model parameter and integrates each of the decompressed local model parameter, and wherein the base station updates the first global parameter to the second global parameter based on the integrated information.

The present disclosure the base station determines the transmission scheme based on previously stored information on the plurality of terminals.

The present disclosure the previously stored information on the plurality of terminals includes at least any one of information on a number of terminals, information on a communication environment, information on a terminal type, and information on a terminal ability.

The present disclosure the, based on the base station determining the transmission scheme based on the previously stored information on the plurality of terminals, the base station calculates information on a threshold number of terminals and determines the transmission scheme based on the calculated information on the threshold number of terminals.

The following effects may be produced by embodiments based on the present disclosure.

According to the present disclosure, a terminal may transmit a signal by considering a federated learning method.

According to the present disclosure, a terminal may flexibly set a transmission technique by considering a radio environment.

According to the present disclosure, a terminal and a base station may configure a network based on federated learning.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
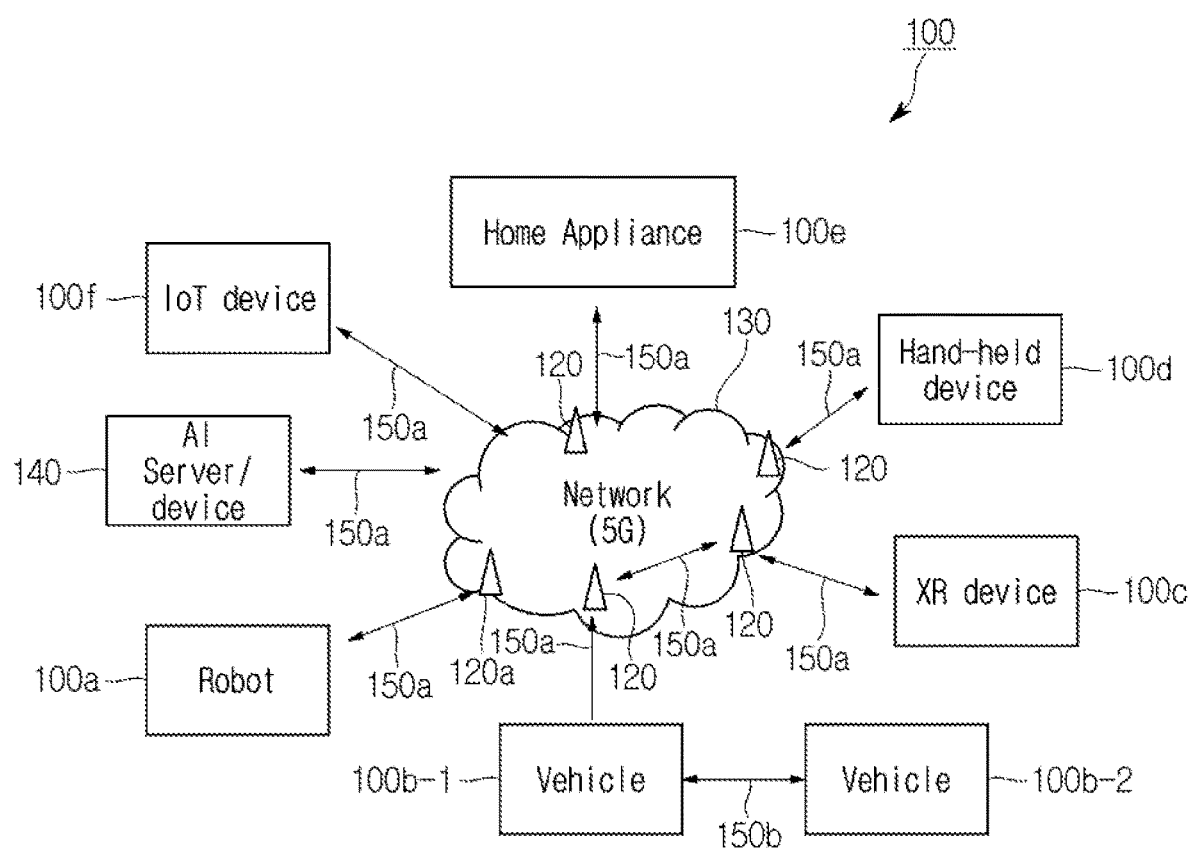
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
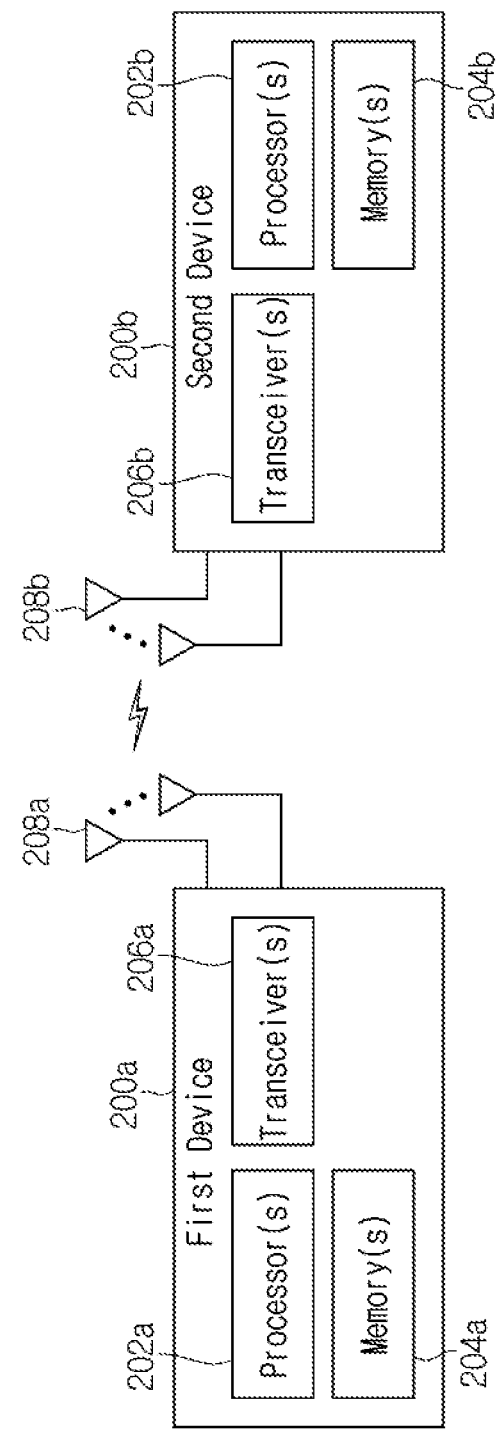
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be coupled with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be coupled with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/ or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be coupled with one or more processors 202a and 202b to transmit/ receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be coupled with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

Figure 3:
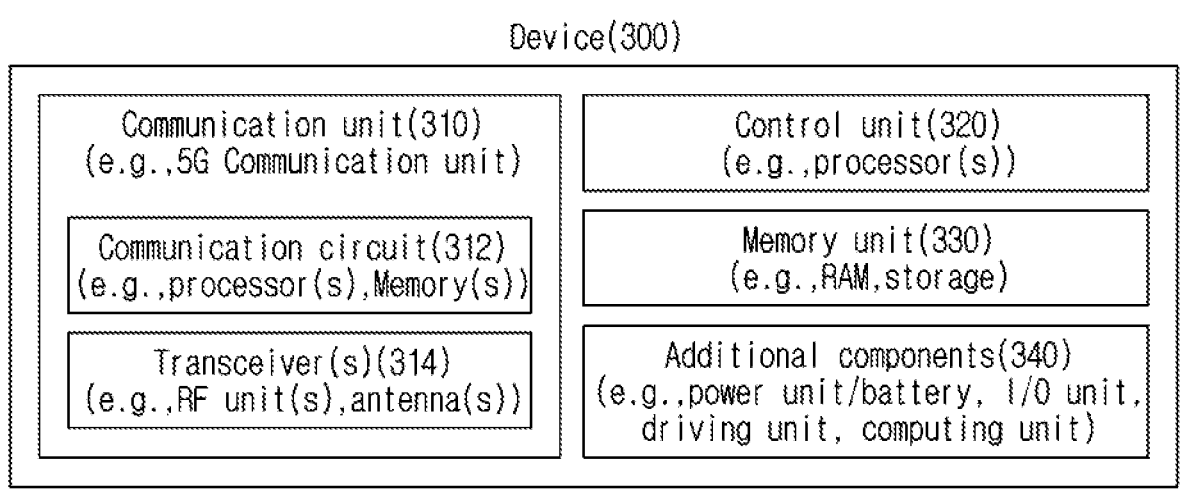
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically coupled with the communication unit 310, the memory unit 330 and the additional components 340 to control overall operation of the wireless device. For example, the control unit 320 may control electrical/ mechanical operation of the wireless device based on a program/code/instruction/information stored in the memory unit 330. In addition, the control unit 320 may transmit the information stored in the memory unit 330 to the outside (e.g., another communication device) through the wireless/ wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
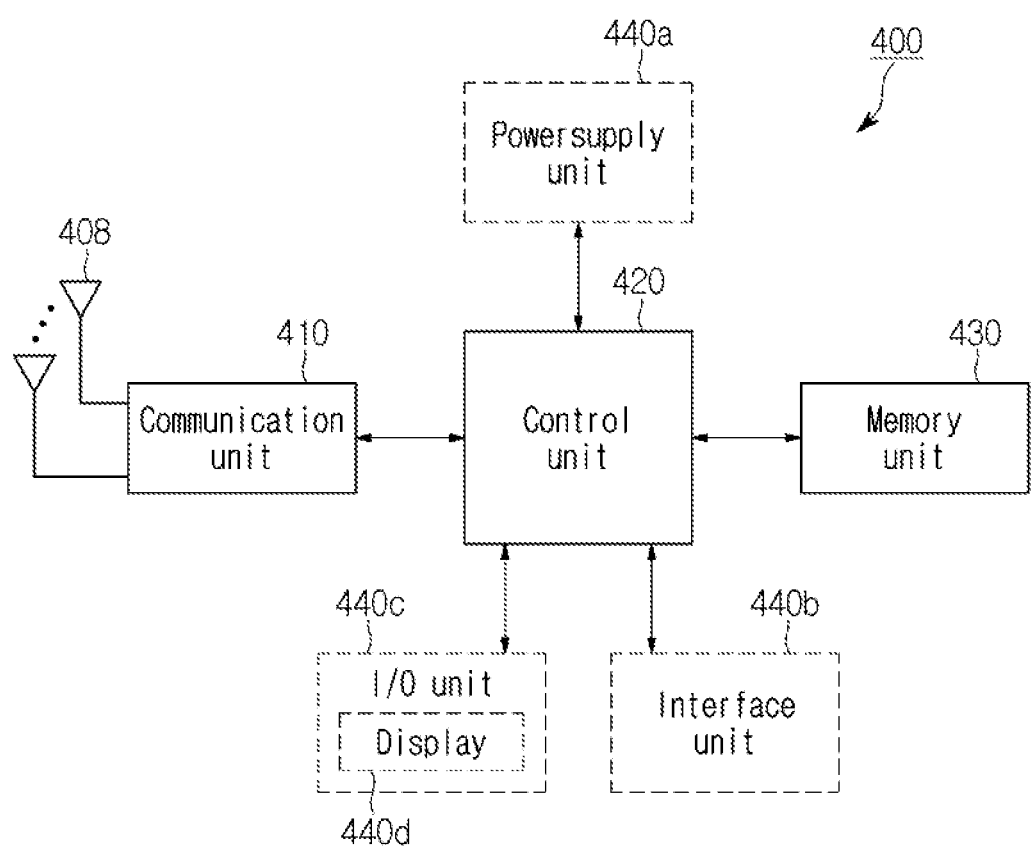
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
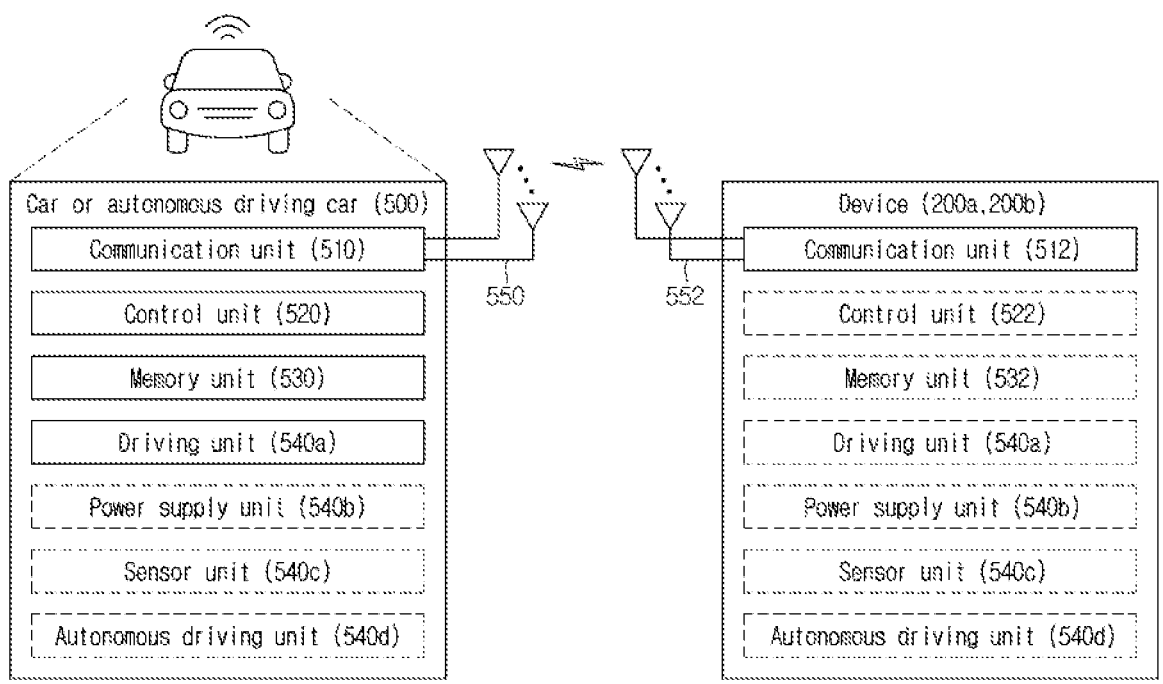
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 54c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU). The driving unit 540a may drive the car or autonomous driving car 500 on the ground. The driving unit 540a may include an engine, a motor, a power train, wheels, a brake, a steering device, etc. The power supply unit 540b may supply power to the car or autonomous driving car 500, and include a wired/wireless charging circuit, a battery, etc. The sensor unit 540c may obtain a vehicle state, surrounding environment information, user information, etc. The sensor unit 540c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 540*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc. from an external server. The autonomous driving unit 540*d* may generate an autonomous driving route and a driving plan based on the acquired data. The control unit 520 may control the driving unit 540*a* (e.g., speed/direction control) such that the car or autonomous driving car 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540*c* may acquire a vehicle state and surrounding environment information. The autonomous driving unit 540*d* may update the autonomous driving route and the driving plan based on newly acquired data/information. The communication unit 510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 6:
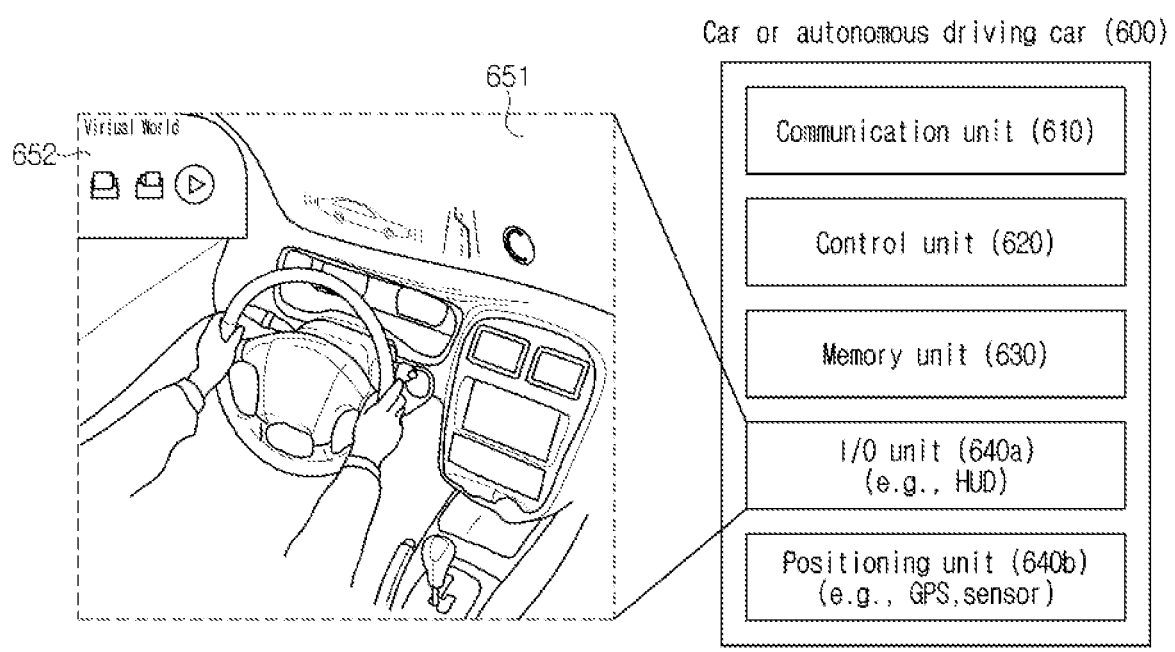
FIG. 6 is a view showing an example of a mobility applicable to the present disclosure.

FIG. 6 is a view showing an example of a mobility applicable to the present disclosure.

Referring to FIG. 6, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 6, the mobility 600 may include a communication unit (transceiver) 610, a control unit (controller) 620, a memory unit (memory) 630, an input/output unit 640*a* and a positioning unit 640*b*. Here, the blocks 610 to 630/640*a* to 640*b* may corresponding to the blocks 310 to 330/340 of FIG. 3.

The communication unit 610 may transmit and receive signals (e.g., data, control signals, etc.) to and from external devices such as another mobility or a base station. The control unit 620 may control the components of the mobility 600 to perform various operations. The memory unit 630 may store data/parameters/programs/code/instructions supporting the various functions of the mobility 600. The input/output unit 640*a* may output AR/VR objects based on information in the memory unit 630. The input/output unit 640*a* may include a HUD. The positioning unit 640*b* may acquire the position information of the mobility 600. The position information may include absolute position information of the mobility 600, position information in a driving line, acceleration information, position information of neighboring vehicles, etc. The positioning unit 640*b* may include a global positioning system (GPS) and various sensors.

For example, the communication unit 610 of the mobility 600 may receive map information, traffic information, etc. from an external server and store the map information, the traffic information, etc. in the memory unit 630. The positioning unit 640*b* may acquire mobility position information through the GPS and the various sensors and store the mobility position information in the memory unit 630. The control unit 620 may generate a virtual object based on the map information, the traffic information, the mobility position information, etc., and the input/output unit 640*a* may display the generated virtual object in a glass window (651 and 652). In addition, the control unit 620 may determine whether the mobility 600 is normally driven in the driving line based on the mobility position information. When the mobility 600 abnormally deviates from the driving line, the control unit 620 may display a warning on the glass window of the mobility through the input/output unit 640*a*. In addition, the control unit 620 may broadcast a warning message for driving abnormality to neighboring mobilities through the communication unit 610. Depending on situations, the control unit 620 may transmit the position information of the mobility and information on driving/mobility abnormality to a related institution through the communication unit 610.

Figure 7:
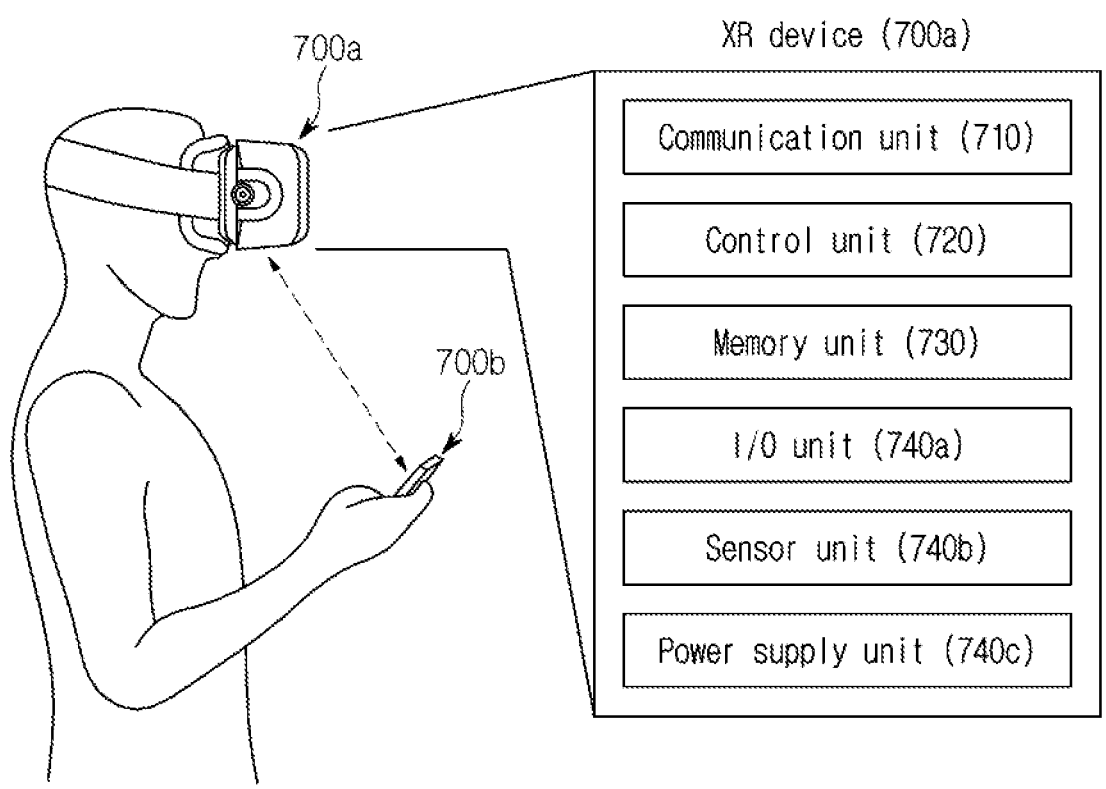
FIG. 7 is a view showing an example of an extended reality (XR) device applicable to the present disclosure.

FIG. 7 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 7, the XR device 700*a* may include a communication unit (transceiver) 710, a control unit (controller) 720, a memory unit (memory) 730, an input/output unit 740*a*, a sensor unit 740*b* and a power supply unit (power supply) 740*c*. Here, the blocks 710 to 730/740*a* to 740*c* may correspond to the blocks 310 to 330/340 of FIG. 3, respectively.

The communication unit 710 may transmit and receive signals (e.g., media data, control signals, etc.) to and from external devices such as another wireless device, a handheld device or a media server. The media data may include video, image, sound, etc. The control unit 720 may control the components of the XR device 700*a* to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700*a* or generate an XR object.

The input/output unit 740*a* may acquire control information, data, etc. from the outside and output the generated XR object. The input/output unit 740*a* may include a camera, a microphone, a user input unit, a display, a speaker and/or a haptic module. The sensor unit 740*b* may obtain an XR device state, surrounding environment information, user information, etc. The sensor unit 740*b* may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 740*c* may supply power to the XR device 700*a* and include a wired/wireless charging circuit, a battery, etc.

For example, the memory unit 730 of the XR device 700*a* may include information (e.g., data, etc.) necessary to generate an XR object (e.g., AR/VR/MR object). The input/output unit 740*a* may acquire an instruction for manipulating the XR device 700*a* from a user, and the control unit 720 may drive the XR device 700*a* according to the driving instruction of the user. For example, when the user wants to watch a movie, news, etc. through the XR device 700a, the control unit 720 may transmit content request information to another device (e.g., a hand-held device 700b) or a media server through the communication unit 730. The communication unit 730 may download/stream content such as a movie or news from another device (e.g., the hand-held device 700b) or the media server to the memory unit 730. The control unit 720 may control and/or perform procedures such as video/image acquisition, (video/image) encoding, metadata generation/processing, etc. with respect to content, and generate/output an XR object based on information on a surrounding space or a real object acquired through the input/output unit 740a or the sensor unit 740b.

In addition, the XR device 700a may be wirelessly connected with the hand-held device 700b through the communication unit 710, and operation of the XR device 700a may be controlled by the hand-held device 700b. For example, the hand-held device 700b may operate as a controller for the XR device 700a. To this end, the XR device 700a may acquire three-dimensional position information of the hand-held device 700b and then generate and output an XR object corresponding to the hand-held device 700b.

Figure 8:
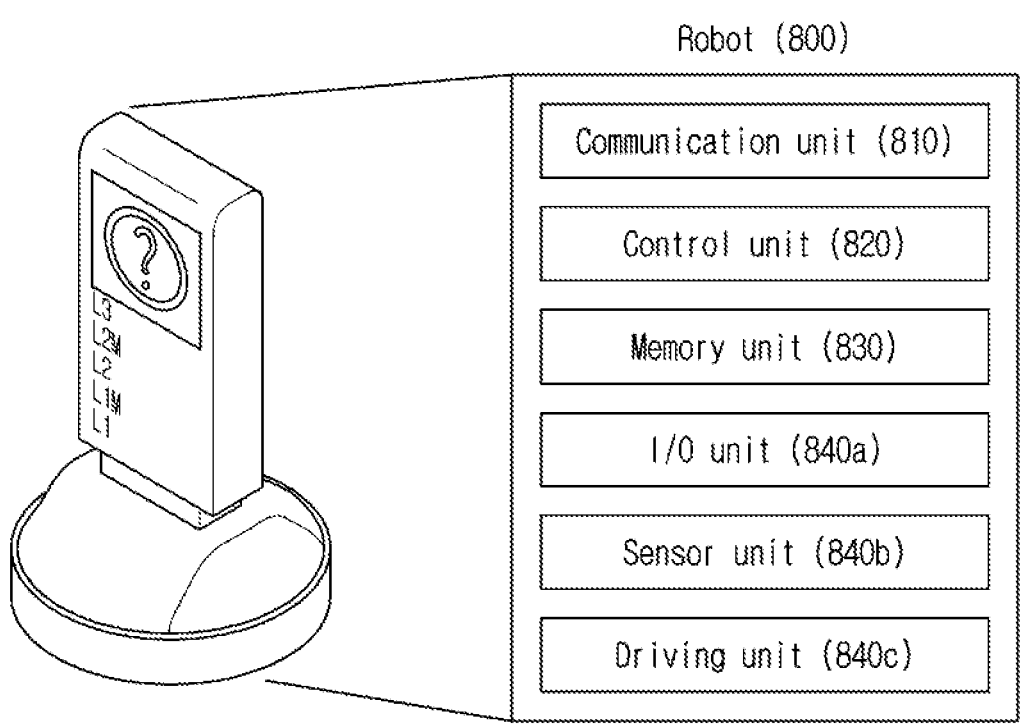
FIG. 8 is a view showing an example of a robot applicable to the present disclosure.

FIG. 8 is a view showing an example of a robot applicable to the present disclosure. For example, the robot may be classified into industrial, medical, household, military, etc. according to the purpose or field of use. At this time, referring to FIG. 8, the robot 800 may include a communication unit (transceiver) 810, a control unit (controller) 820, a memory unit (memory) 830, an input/output unit 840a, sensor unit 840b and a driving unit 840c. Here, blocks 810 to 830/840a to 840c may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840a may acquire information from the outside of the robot 800 and output information to the outside of the robot 800. The input/output unit 840a may include a camera, a microphone, a user input unit, a display, a speaker and/or a haptic module.

The sensor unit 840b may obtain internal information, surrounding environment information, user information, etc. of the robot 800. The sensor unit 840b may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 840c may perform various physical operations such as movement of robot joints. In addition, the driving unit 840c may cause the robot 800 to run on the ground or fly in the air. The driving unit 840c may include an actuator, a motor, wheels, a brake, a propeller, etc.

Figure 9:
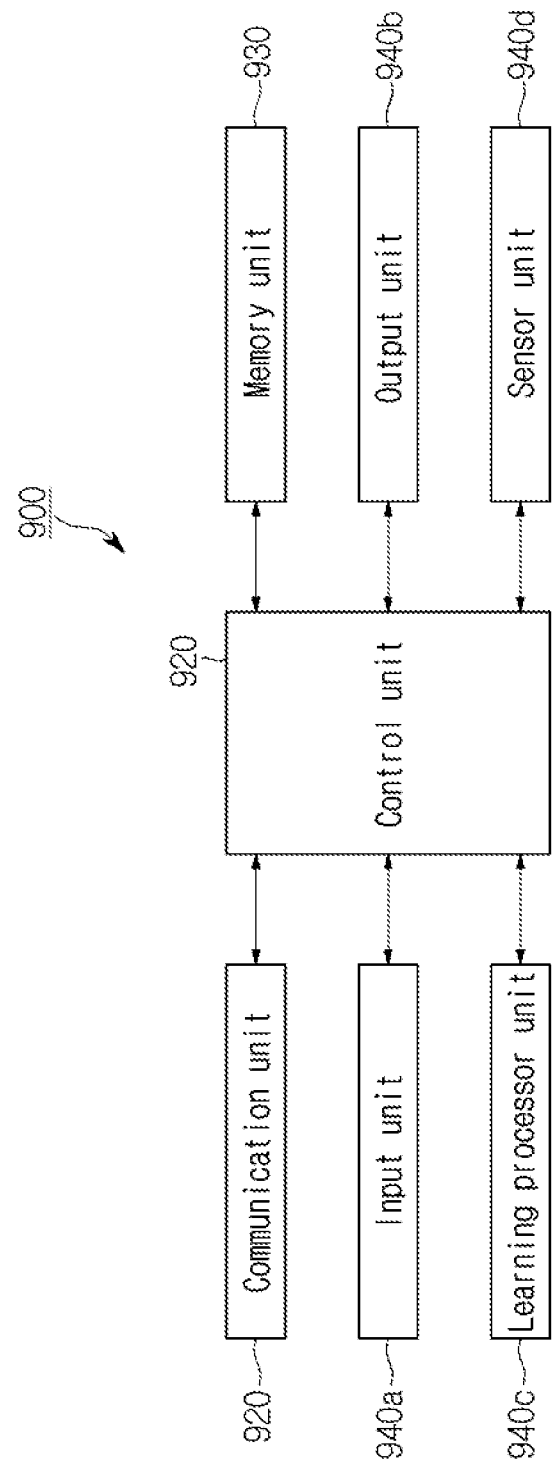
FIG. 9 is a view showing an example of artificial intelligence (AI) device applicable to the present disclosure.

FIG. 9 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940a/940b, a leaning processor unit (learning processor) 940c and a sensor unit 940d. The blocks 910 to 930/940a to 940d may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100x, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940c or the memory unit 930, and control the components of the AI device 900 to perform predicted operation or operation, which is determined to be desirable, of at least one executable operation. In addition, the control unit 920 may collect history information including operation of the AI device 900 or user's feedback on the operation and store the history information in the memory unit 930 or the learning processor unit 940c or transmit the history information to the AI server (FIG. 1, 140). The collected history information may be used to update a learning model.

The memory unit 930 may store data supporting various functions of the AI device 900. For example, the memory unit 930 may store data obtained from the input unit 940a, data obtained from the communication unit 910, output data of the learning processor unit 94c, and data obtained from the sensing unit 940. In addition, the memory unit 930 may store control information and/or software code necessary to operate/execute the control unit 920.

The input unit 940a may acquire various types of data from the outside of the AI device 900. For example, the input unit 940a may acquire learning data for model learning, input data, to which the learning model will be applied, etc. The input unit 940a may include a camera, a microphone and/or a user input unit. The output unit 940b may generate video, audio or tactile output. The output unit 940b may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 940c may train a model composed of an artificial neural network using training data. The learning processor unit 940c may perform AI processing along with the learning processor unit of the AI server (FIG. 1, 140). The learning processor unit 940c may process information received from an external device through the communication unit 910 and/or information stored in the memory unit 930. In addition, the output value of the learning processor unit 940c may be transmitted to the external device through the communication unit 910 and/or stored in the memory unit 930.

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 10:
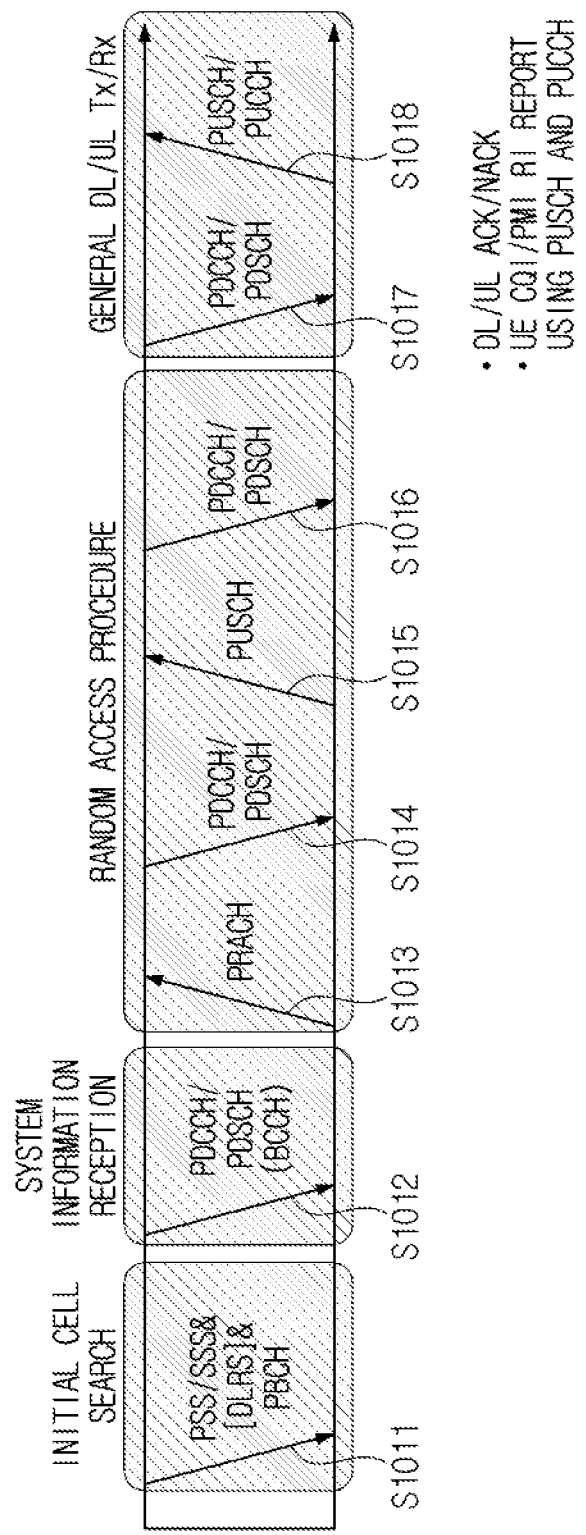
FIG. 10 is a view showing physical channels applicable to the present disclosure and a signal transmission method using the same.

FIG. 10 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S1012, thereby acquiring more detailed system information.

Thereafter, the UE may perform a random access procedure such as steps S1013 to S1016 in order to complete access to the base station. To this end, the UE may transmit a preamble through a physical random access channel (PRACH) (S1013) and receive a random access response (RAR) to the preamble through a physical downlink control channel and a physical downlink shared channel corresponding thereto (S1014). The UE may transmit a physical uplink shared channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a physical uplink shared channel (PUSCH) signal and/or a physical uplink control channel (PUCCH) signal (S1018) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), preceding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 11:
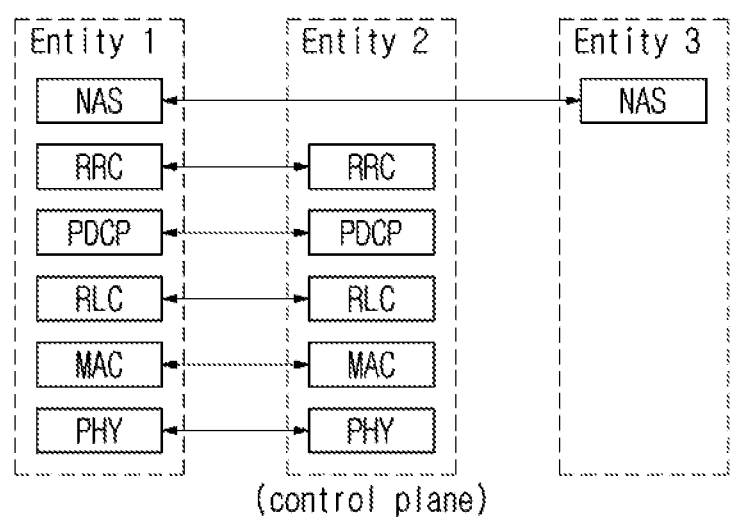
FIG. 11 is a view showing the structure of a control plane and a user plane of a radio interface protocol applicable to the present disclosure.
Figure 11:
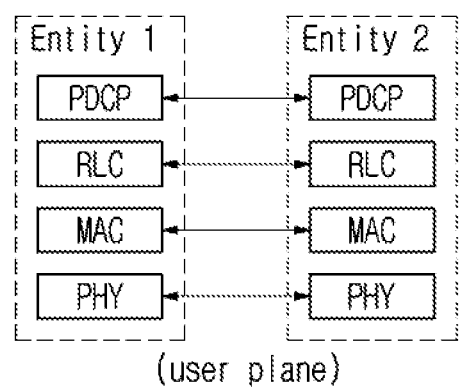

FIG. 11 is a view showing the structure of a control plane and a user plane of a radio interface protocol applicable to the present disclosure.

Referring to FIG. 11, Entity 1 may be a user equipment (UE). At this time, the UE may be at least one of a wireless device, a hand-held device, a vehicle, a mobility, an XR device, a robot or an AI device, to which the present disclosure is applicable in FIGS. 1 to 9. In addition, the UE refers to a device, to which the present disclosure is applicable, and is not limited to a specific apparatus or device.

Entity 2 may be a base station. At this time, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

Entity 3 may be a device for performing a network apparatus or a network function. At this time, the network apparatus may be a core network node (e.g., mobility management entity (MME) for managing mobility, an access and mobility management function (AMF), etc. In addition, the network function may mean a function implemented in order to perform a network function. Entity 3 may be a device, to which a function is applied. That is, Entity 3 may refer to a function or device for performing a network function and is not limited to a specific device.

A control plane refers to a path used for transmission of control messages, which are used by the UE and the network to manage a call. A user plane refers to a path in which data generated in an application layer, e.g. voice data or Internet packet data, is transmitted. At this time, a physical layer which is a first layer provides an information transfer service to a higher layer using a physical channel. The physical layer is connected to a media access control (MAC) layer of a higher layer via a transmission channel. At this time, data is transmitted between the MAC layer and the physical layer via the transmission channel. Data is also transmitted between a physical layer of a transmitter and a physical layer of a receiver via a physical channel. The physical channel uses time and frequency as radio resources.

The MAC layer which is a second layer provides a service to a radio link control (RLC) layer of a higher layer via a logical channel. The RLC layer of the second layer supports reliable data transmission. The function of the RLC layer may be implemented by a functional block within the MAC layer. A packet data convergence protocol (PDCP) layer which is the second layer performs a header compression function to reduce unnecessary control information for efficient transmission of an Internet protocol (IP) packet such as an IPv4 or IPv6 packet in a radio interface having relatively narrow bandwidth. A radio resource control (RRC) layer located at the bottommost portion of a third layer is defined only in the control plane. The RRC layer serves to control logical channels, transmission channels, and physical channels in relation to configuration, re-configuration, and release of radio bearers. A radio bearer (RB) refers to a service provided by the second layer to transmit data between the UE and the network. To this end, the RRC layer of the UE and the RRC layer of the network exchange RRC messages. A non-access stratum (NAS) layer located at a higher level of the RRC layer performs functions such as session management and mobility management. One cell configuring a base station may be set to one of various bandwidths to provide a downlink or uplink transmission service to several UEs. Different cells may be set to provide different bandwidths. Downlink transmission channels for transmitting data from a network to a UE may include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at a higher level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 12:
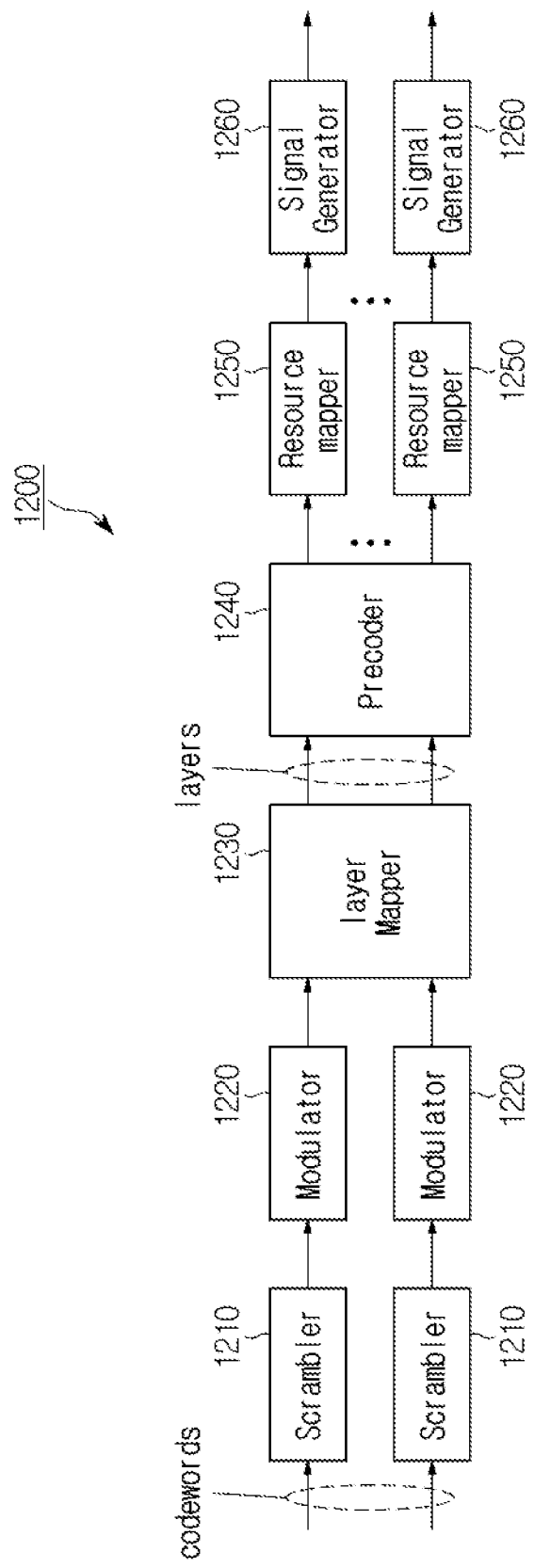
FIG. 12 is a view showing a method of processing a transmitted signal applicable to the present disclosure.

FIG. 12 is a view showing a method of processing a transmitted signal applicable to the present disclosure. For example, the transmitted signal may be processed by a signal processing circuit. At this time, a signal processing circuit 1200 may include a scrambler 1210, a modulator 1220, a layer mapper 1230, a precoder 1240, a resource mapper 1250, and a signal generator 1260. At this time, for example, the operation/function of FIG. 12 may be performed by the processors 202a and 202b and/or the transceiver 206a and 206b of FIG. 2. In addition, for example, the hardware element of FIG. 12 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 1210 to 1250 may be implemented in the processors 202a and 202b of FIG. 2 and a block 1260 may be implemented in the transceivers 206a and 206b of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 1210. The scramble sequence used for scramble is generated based in an initial value and the initial value may include ID information of a wireless device, etc. The scrambled bit sequence may be modulated into a modulated symbol sequence by the modulator 1220. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 1230. Modulation symbols of each transport layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transport layers. Here, the precoder 1240 may perform precoding after transform precoding (e.g., discrete Fourier transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Figure 13:
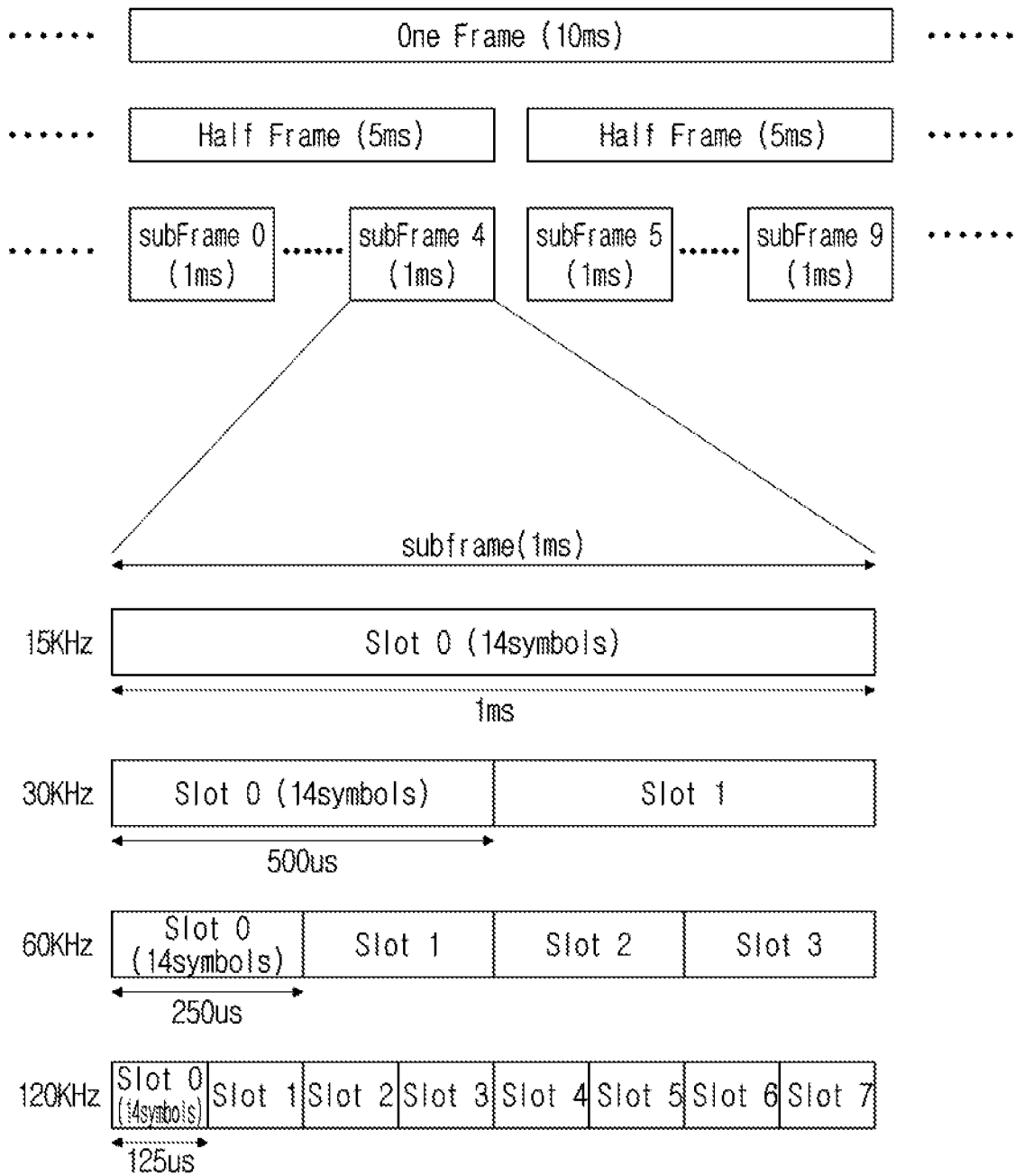
FIG. 13 is a view showing the structure of a radio frame applicable to the present disclosure.

FIG. 13 is a view showing the structure of a radio frame applicable to the present disclosure.

UL and DL transmission based on an NR system may be based on the frame shown in FIG. 13. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| μ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In Tables 1 and 2 above, Nslotsymb may indicate the number of symbols in a slot, Nframe,μslot may indicate the number of slots in a frame, and Nsubframe,μslot may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

6G (radio communications) systems are characterized by (i) very high data rates per device, (ii) very large number of connected devices, (iii) global connectivity, (iv) very low latency, (v) battery—It aims to lower energy consumption of battery-free IoT devices, (vi) ultra-reliable connectivity, and (vii) connected intelligence with machine learning capabilities. The vision of the 6G system can be four aspects such as "intelligent connectivity", "deep connectivity", "holographic connectivity", and "ubiquitous connectivity", and the 6G system can satisfy the requirements shown in Table 4 below. That is, Table 4 is a table showing the requirements of the 6G system.

TABLE 4

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 14:
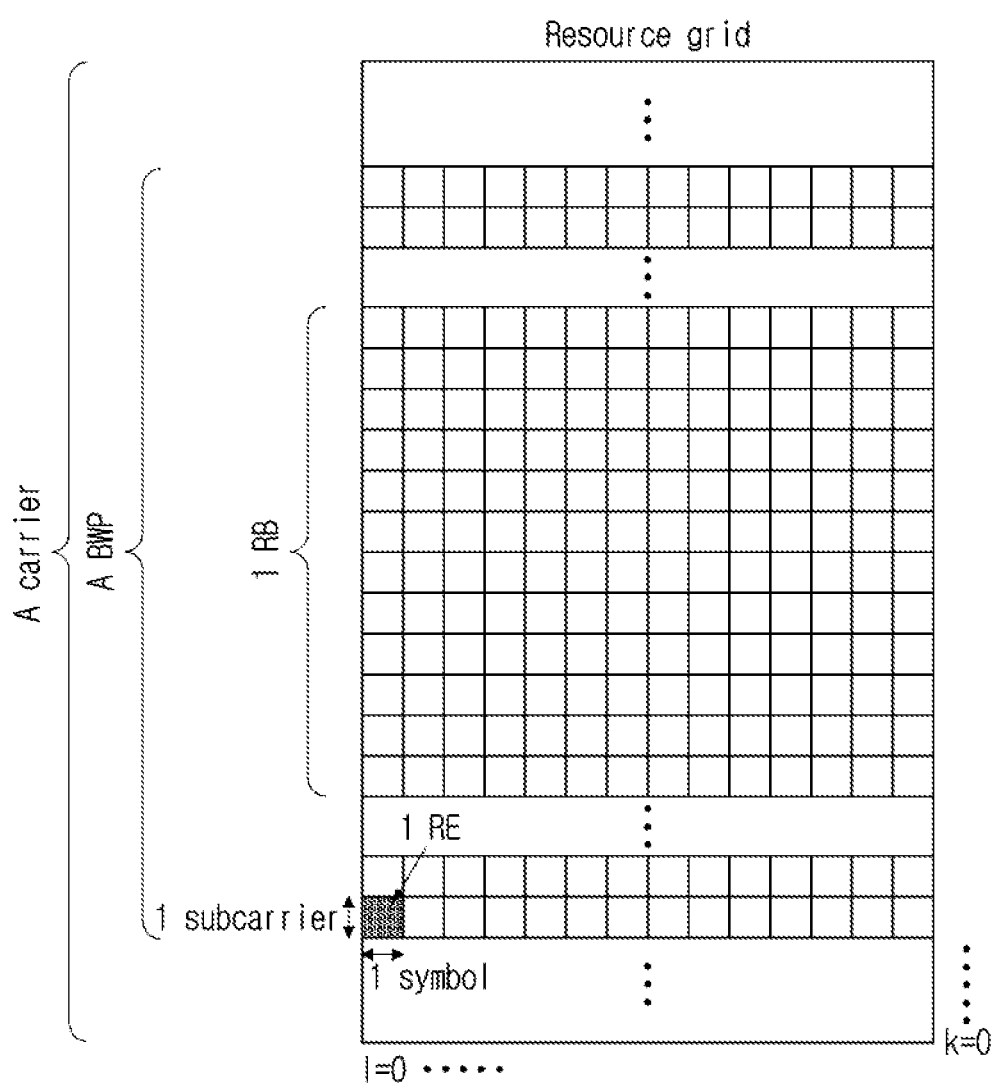
FIG. 14 is a view showing a slot structure applicable to the present disclosure.

FIG. 14 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 15:
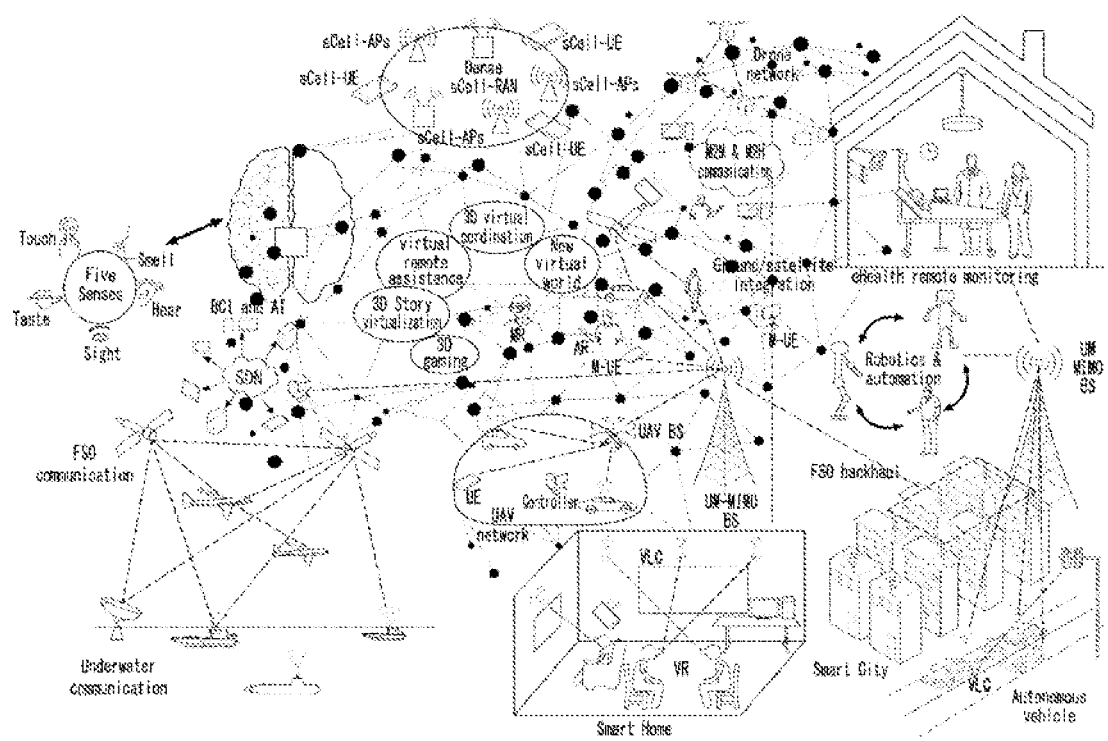
FIG. 15 is a view showing an example of a communication structure providable in a 6th generation (6G) system applicable to the present disclosure.

FIG. 15 is a view showing an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 16:
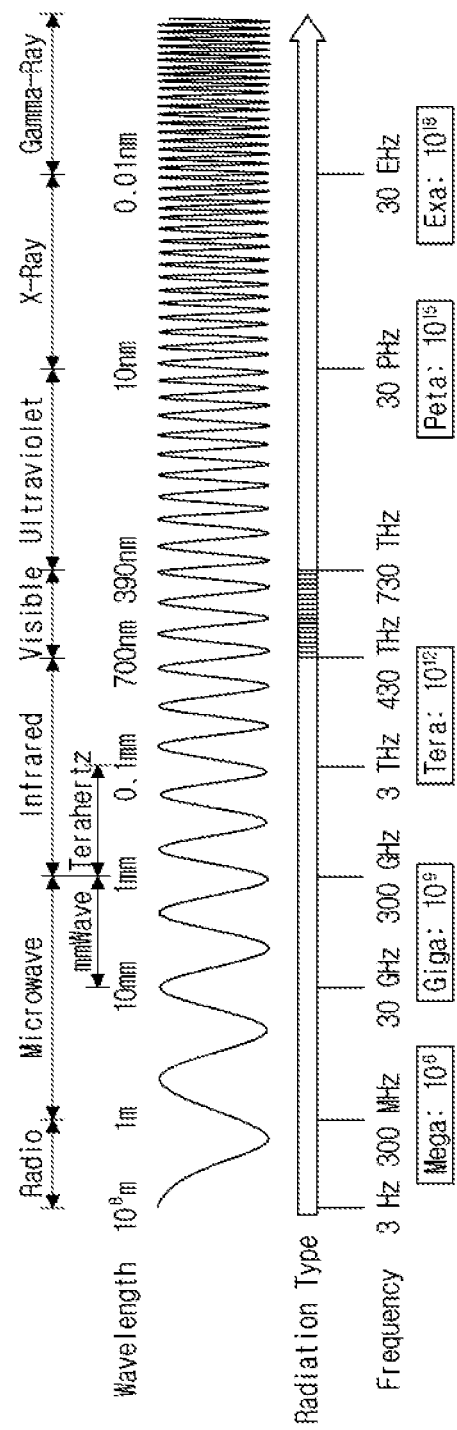
FIG. 16 is a view showing an electromagnetic spectrum applicable to the present disclosure.

FIG. 16 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 17:
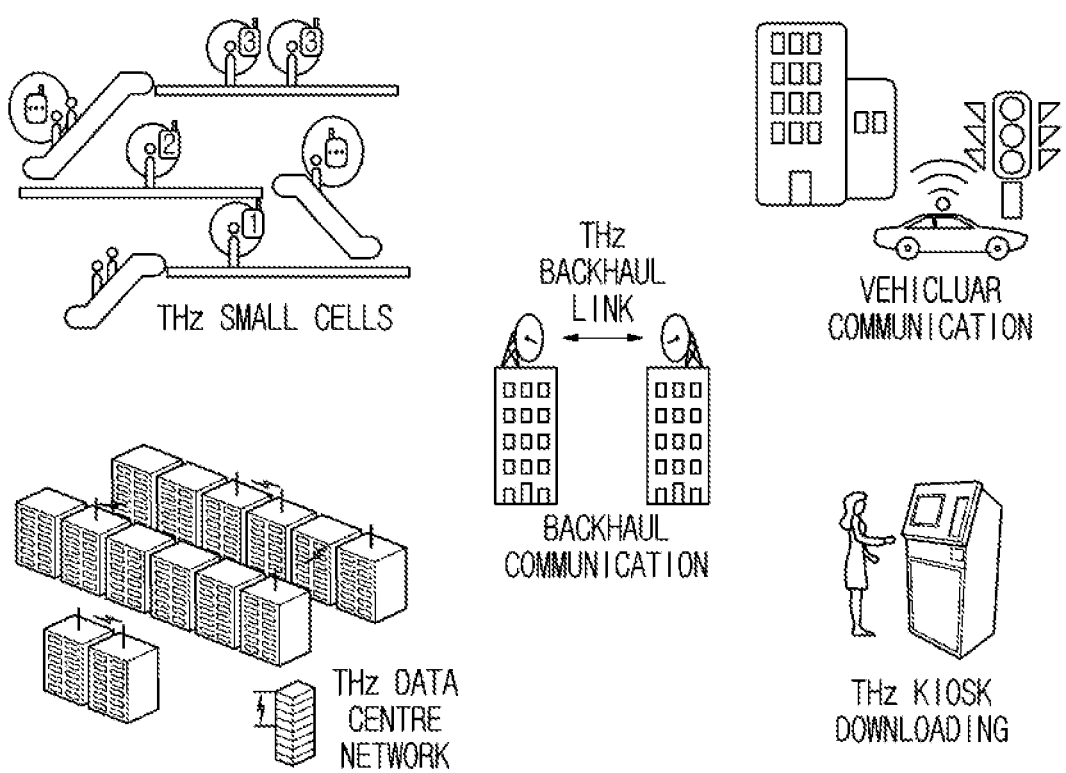
FIG. 17 is a view showing a THz communication method applicable to the present disclosure.

FIG. 17 is a view showing a THz communication method applicable to the present disclosure.

Referring to FIG. 17, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multipoint connection such as wireless connection in a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |

TABLE 5-continued

| | |
|---|---|
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
FIG. 18 is a view showing a THz wireless communication transceiver applicable to the present disclosure.

FIG. 18 is a view showing a THz wireless communication transceiver applicable to the present disclosure.

Referring to FIG. 18, THz wireless communication may be classified based on the method of generating and receiving THz. The THz generation method may be classified as an optical component or electronic component based technology.

At this time, the method of generating THz using an electronic component includes a method using a semiconductor component such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 19:
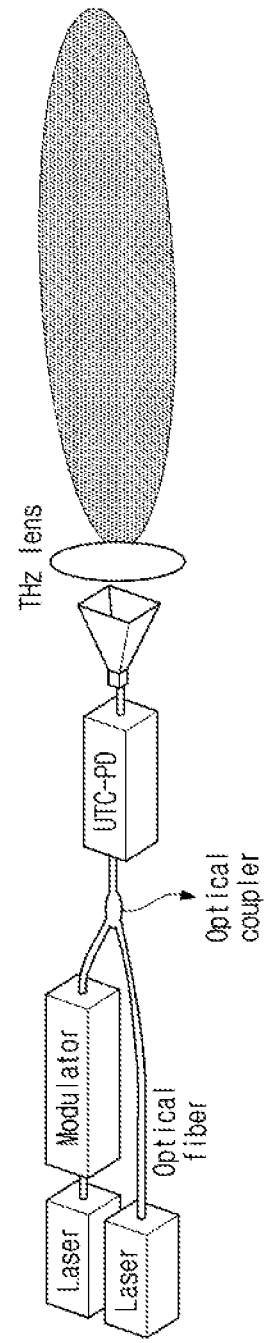
FIG. 19 is a view showing a THz signal generation method applicable to the present disclosure.
Figure 20:
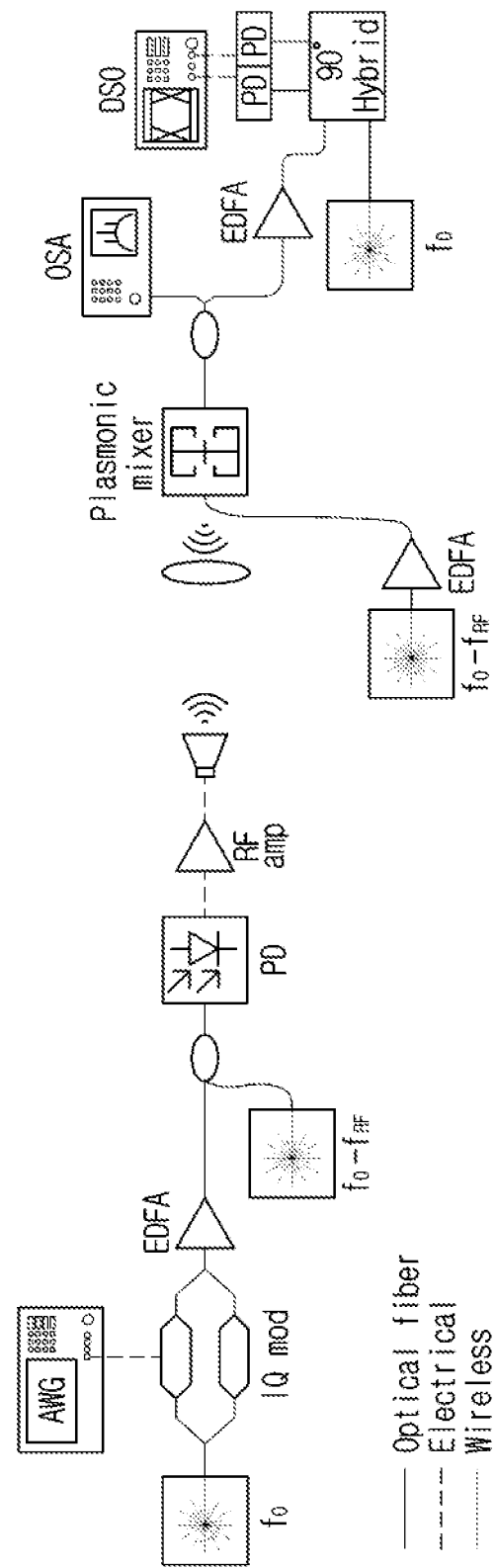
FIG. 20 is a view showing a wireless communication transceiver applicable to the present disclosure.

FIG. 19 is a view showing a THz signal generation method applicable to the present disclosure. FIG. 20 is a view showing a wireless communication transceiver applicable to the present disclosure.

Referring to FIGS. 19 and 20, the optical component-based THz wireless communication technology means a method of generating and modulating a THz signal using an optical component. The optical component-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic component, can generate a high-power signal, and can obtain a flat response characteristic in a wide frequency band. In order to generate the THz signal based on the optical component, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor component that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more.

In FIG. 20, an erbium-doped fiber amplifier (EDFA) represents an optical fiber amplifier to which erbium is added, a photo detector (PD) represents a semiconductor component capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 21:
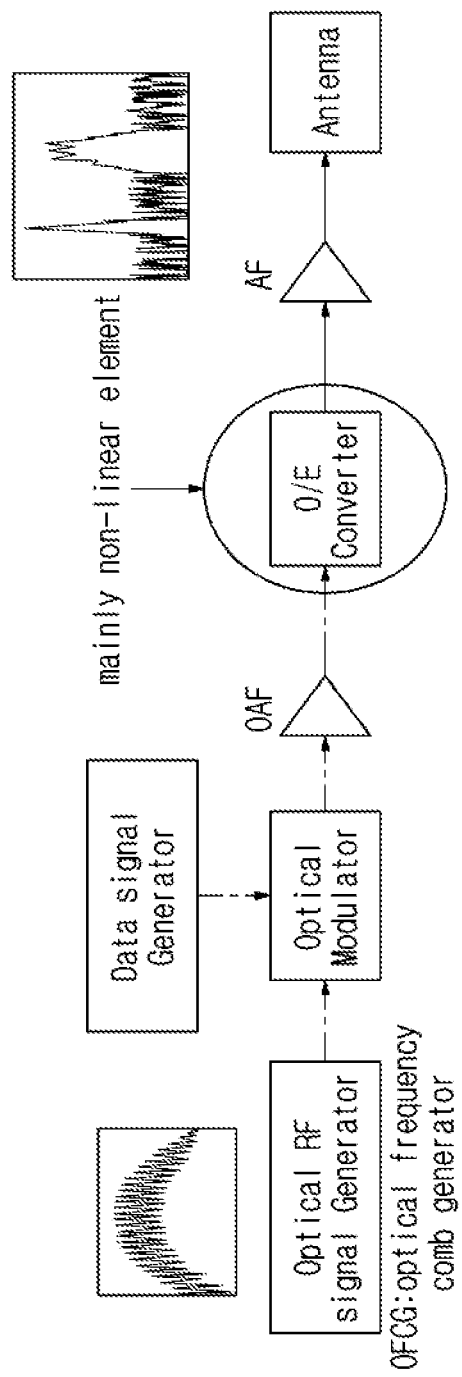
FIG. 21 is a view showing a transmitter structure applicable to the present disclosure.
Figure 22:
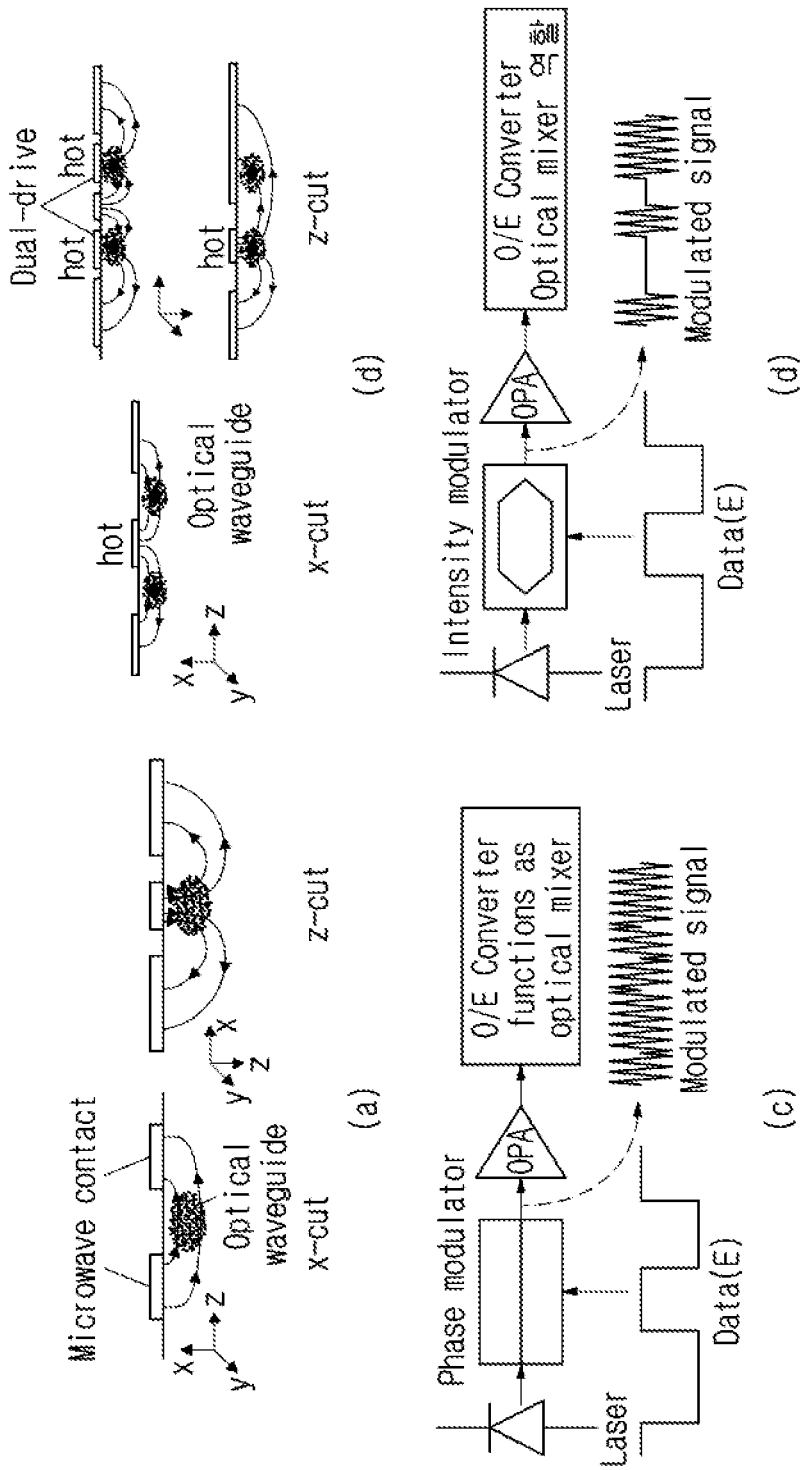
FIG. 22 is a view showing a modulator structure applicable to the present disclosure.

FIG. 21 is a view showing a transmitter structure applicable to the present disclosure. FIG. 22 is a view showing a modulator structure applicable to the present disclosure.

Referring to FIGS. 21 and 22, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (OLE converter) may generate THz pulses according to optical rectification operation by a nonlinear crystal, photoelectric conversion (OLE conversion) by a photoconductive antenna, and emission from a bunch of relativistic electrons. The terahertz pulse (THz pulse) generated in the above manner may have a length of a unit from femto second to pico second. The photoelectric converter (OLE converter) performs down conversion using non-linearity of the component.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Figure 23:
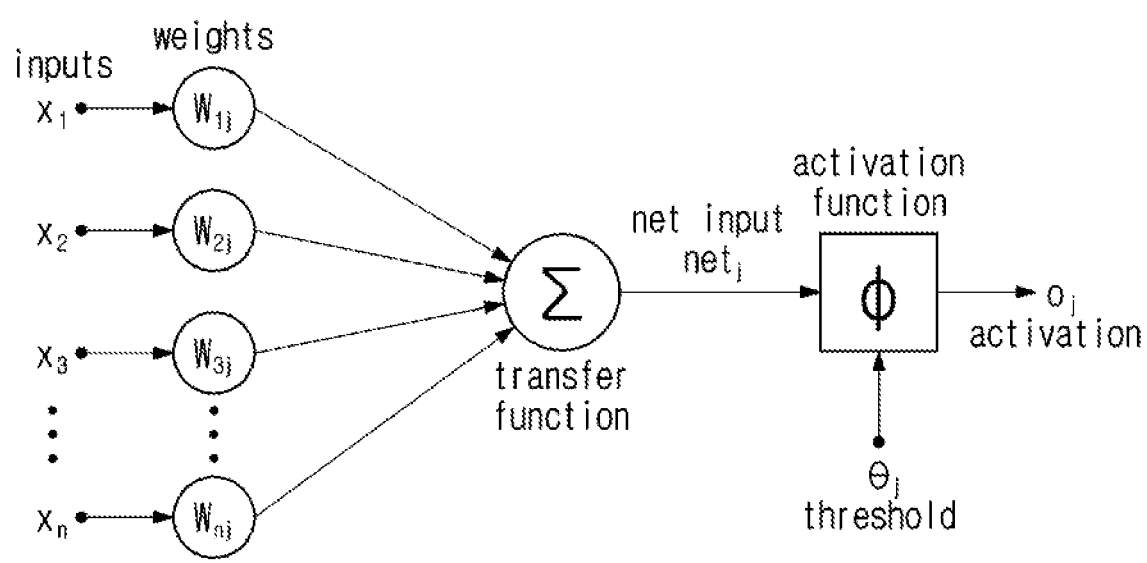
FIG. 23 is a view showing a neural network applicable to the present disclosure.

FIG. 23 is a view showing a neural network applicable to the present disclosure.

As described above, the artificial intelligence (AI) technology may be introduced to a new communication system (e.g., 6G system). Herein, the AI may utilizes a neural network as a machine learning model that imitates human brain.

Specifically, a device may process arithmetic operations of 0 and 1 and, based on this, execute an operation and communication. Herein, the technical advances enable devices to process more arithmetic operations in a shorter time and with lower power consumption. On the other hand, people cannot do arithmetic operations as fast as devices. Human brains may not have been made only to process arithmetic operations as fast as possible. However, people can perform other operations like recognition and natural language processing. Herein, the above-described operations are intended to process things beyond arithmetic operations, and devices cannot currently process those things at a level achieved by human brains. Accordingly, it may be worthwhile to consider creating a system that makes devices achieve human-level performance in such areas as natural language processing and computer vision. In consideration of what is described above, a neural network may be a model based on the idea that human brain can be imitated.

Herein, a neural network may be a simple mathematical model built upon the above-described motivation. Herein, the human brain may consist of an enormous number of neurons and synapses connecting neurons. In addition, according to how each neuron is activated, an action may be taken by selecting whether or not other neurons are activated. Based on the above-described facts, a neural network may define a mathematical model.

As an example, it is possible to generate a network in which neurons are nodes and synapses connecting the neurons are edges. At this time, each synapse may have a different importance. That is, a weight may be defined separately for each edge.

As an example, referring to FIG. 23, a neural network may be a directed graph. That is, information propagation may be fixed in a single direction. As an example, in case there is an undirected edge or identical directed edges are given in both directions, information propagation may occur recursively. Accordingly, the neural network may have complex results. As an example, a neural network as described above may be a recurrent neural network (RNN). Herein, since a RNN has an effect of storing past data, it has frequently used to process sequential data like voice recognition in recent years. In addition, a multi-layer perception (MLP) architecture may be a directed simple graph.

Herein, there is no connection in a same layer. That is, there is neither self-loop and nor a parallel edge, and an edge may exist only between layers. In addition, an edge may exist only between layers adjacent to each other. That is, in FIG. 23, there is no edge connecting a first layer and a fourth layer. As an example, unless there is a special remark on a layer, it may be the above-described MLP but is not limited thereto. In the above-described case, information propagation may occur only in a forward direction. Accordingly, the above-described network may be a feed-forward network but is not limited thereto.

In addition, as an example, in an actual brain, different neurons may be activated, and a corresponding result may be delivered to a next neuron. In the above-described method, a neuron making a final decision may activate a result value and the process information. Herein, if the above-described method is changed into a mathematical model, an activation condition for input data may be expressed by a function. Herein, the above-described function may be referred to as an activate function.

As an example, the simplest activate function may be a function that aggregates all the input data and then compares the sum with a threshold. As an example, in case a sum of all input data exceeds a specific value, a device may process information by activation. On the other hand, in case a sum of all input data does not exceed a specific value, a device may process information by inactivation.

As another example, there may be various forms of activate functions. As an example, for convenience of explanation, Formula 1 may be defined. Herein, in Formula 1, not only a weight but also a bias need to be considered, and the weight and the bias may be expressed as in Formula 2. However, since a bias (b) and a weight (w) are almost identical with each other, the description below will consider only the weight. However, the present disclosure is not limited thereto. As an example, since w0 becomes a bias by adding x0 that always has a value of 1, a virtual input may be assumed so that the weight and the bias can be treated to be identical, but the present disclosure is not limited to the above-described embodiment.

$$t = \Sigma_i w_i x_i \quad \text{[Formula 1]}$$

$$t = \Sigma_i w_i x_i + b_i \quad \text{[Formula 2]}$$

A model based on what is described above may first define a shape of a network consisting of a node and an edge. Then, the model may define an activate function for each node. In addition, a parameter adjusting the model has a role of a weight of edge, and a mathematical model may be trained to find a most appropriate weight. As an example, Formula 3 to Formula 6 below may be one form of the above-described activate function but are not limited to a specific form.

$$\text{Sigmoid function: } f(t) = \frac{1}{1+e^{-t}} \quad \text{[Formula 3]}$$

$$\text{Tanh function:: } f(t) = \frac{1-e^{-t}}{1+e^{-t}} \quad \text{[Formula 4]}$$

$$\text{Absolute function: } f(t) = \|t\| \quad \text{[Formula 5]}$$

$$\text{ReLu function: } f(t) = \max(0, t) \quad \text{[Formula 6]}$$

In addition, as an example, in case a mathematical model is trained, it is necessary to assume the every parameter is determined and to check how a neural network interfaces with a result. Herein, the neural network may first determine, for a given input, activation of a next layer and then determine activation of a next layer according to the determined activation. Based on the above-described method, an interface may be determined by checking a result of a last decision layer.

Figure 24:
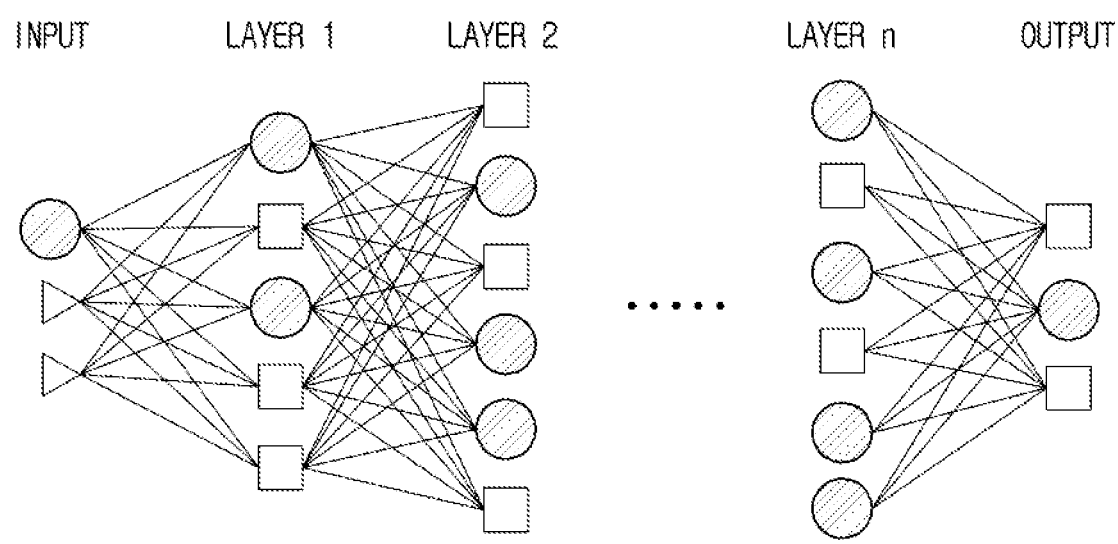
FIG. 24 is a view showing an activation node in a neural network applicable to the present disclosure.

As an example, FIG. 24 is a view showing an activation node in a neural network applicable to the present disclosure. Referring to FIG. 24, when classification is performed, after as many decision nodes as the number of classes to be classified are generated in a last layer, one of the nodes may be activated to select a value.

In addition, as an example, it is possible to consider a case in which activate functions of a neural network is non-linear and the functions forms a complicated configuration by becoming layers for each other. Herein, weight optimization of a neural network may be non-convex optimization. Accordingly, it may be impossible to find a global optimum of parameters of the neural network. In consideration of what is described above, a method of converging to a suitable value may be used by the gradient descent method. As an example, every optimization problem can be solved only when a target function is defined.

In a neural network, a loss function may be calculated between a target output that is actually wanted in a final decision layer and an estimated output generated by a current network, and thus a corresponding value may be minimized. As an example, a loss function may be Formula 7 to Formula 9 but is not limited thereto.

Herein, it is possible to consider a case in which a d-dimensional target output and an estimated output are defined as t=[t1, . . . , td] and x=[x1, . . . , xd] respectively. Here, Formula 7 to Formula 9 may be a loss function for optimization.

$$\text{Sum of Euclidean loss: } \sum_{i=1}^{d}(t_i - x_i)^2 \quad \text{[Formula 7]}$$

$$\textit{Softmax loss: } -\sum_{i=1}^{d} t_i \log \frac{e^{x_j}}{\sum_{j=1}^{d} e^{x_j}} + (1 - t_i)\log\left(1 - \frac{e^{x_j}}{\sum_{j=1}^{d} e^{x_j}}\right) \quad \text{[Formula 8]}$$

$$\text{Cross-entropy loss: } -\sum_{i=1}^{d} t_i \log x_i + (1 - t_i)\log(1 - x_i) \quad \text{[Formula 9]}$$

In case the above-described loss function is given, gradients may be obtained for parameters, and then the parameters may be updated using the values.

As an example, a backpropagation algorithm may be an algorithm that simply calculates a gradient by using a chain rule. Based on the above-described algorithm, parallelization may also be easy to calculate a gradient of each parameter. In addition, a memory may also be saved through an algorithm design. Accordingly, a backpropagation algorithm may be used for updating a neural network. In addition, an example, a gradient for a current parameter needs to be calculated to use the gradient descent method. Herein, when a network becomes complex, a corresponding value may be complicated to calculate. On the other hand, in a backpropagation algorithm, a loss is first calculated by using a current parameter, and how much the loss is affected by each parameter may be calculated through a chain rule. An update may be performed based on a calculated value. As an example, a backpropagation algorithm may be divided into two phases. The one may be a propagation phase, and the other may be a weight update phase. Herein, in the propagation phase, an error or a change amount of each neuron may be calculated from a training input pattern. In addition, as an example, in the weight update phase, a weight may be updated by using the calculated value. As an example, the specific phases may be described as in Table 6 below.

TABLE 6

Phase 1: Propagation
 Forward propagation: calculates an output from input training data and calculates an error at each output neuron. Here, since information flows in the direction of input −> hidden −> output, it is called 'forward' propagation.
 Back propagation: calculates, by using a weight of each edge, how much an error calculated at an output neuron is affected by neuron of a previous layer. Here, since information flows in the direction of output −> hidden, it is called 'back' propagation.

TABLE 6-continued

Phase 2: Weight update
 Gradients of parameters are calculated by using a chain rule. Here, as shown in FIG. 25, the usage of a chain rule means that a current gradient is updated by using a previously-calculated gradient.

Figure 25:
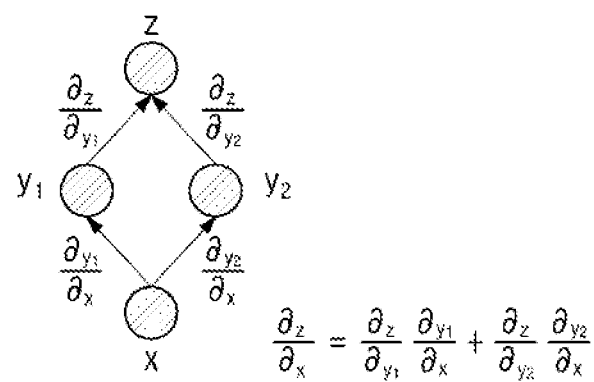
FIG. 25 is a view showing a method of calculating a gradient by using a chain rule applicable to the present disclosure.
Figure 25:
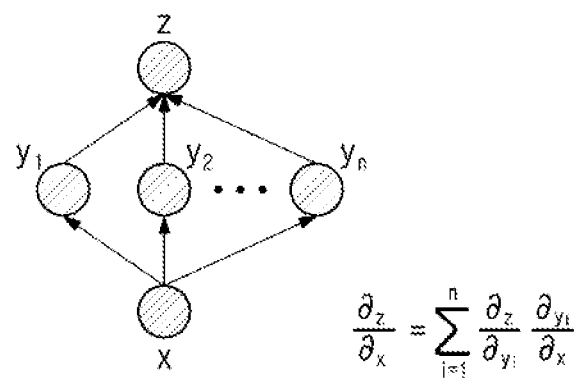

As an example, FIG. 25 is a view showing a method of calculating a gradient by using a chain rule applicable to the present disclosure. Referring to FIG. 25, a method of obtaining $$\frac{\partial z}{\partial x}$$

may be disclosed. Herein, instead of calculating the value, a desired value may be calculated by using $$\frac{\partial z}{\partial y},$$

which is a derivative already calculated in a y-layer, and $$\frac{\partial y}{\partial x}$$

that is related only to the y-layer and x. If there is a parameter x' under x, $$\frac{\partial z}{\partial x'}$$

may be calculated by uing $$\frac{\partial z}{\partial x} \text{ and } \frac{\partial x'}{\partial x}.$$

Accordingly, a backpropagation algorithm may require only a derivative of an immediately previous variable of a parameter to be currently updated and a differential value of an immediately previous variable with respect to a current parameter.

The above-described process may be repeated downwards sequentially from an output layer. That is, a weight may keep updated in the process of "output→hidden k, hidden k→hidden k−1, . . . hidden 2→hidden 1, hidden 1→input". After a gradient is calculated, only a parameter may be updated by using the gradient descent method itself.

However, since a neural network has an enormous number of datasets, all the gradients needs to be calculated for all the training data in order to calculate an accurate gradient. Herein, after an accurate gradient is obtained by calculating an average of the values, the update may be performed 'once'. However, as the above-described method is inefficient, the stochastic gradient descent (SDG) method may be used. Herein, instead of performing a gradient update by calculating an average of gradients of all the data (which referred to as full batch), the SGD may update all the parameters by forming a 'mini batch' from a part of the data and calculating a gradient only for a single batch. In case of convex optimization, when a specific condition is satisfied, it may be demonstrated that SGD and GD converge to a same global optimum, but since a neural network is not convex, a convergence condition may change according to a method of configuring a batch.

Complex Valued Neural Networks

A neural network processing complex numbers may have many advantages including neural network description and parameter representation. However, in comparison with using a real neural network processing real numbers, there may be some points to be considered for using a complex value neural network. As an example, when updating a weight through backpropagation, it is necessary to consider a constraint on an activate function. As an example, in the case of the sigmoid function $$f(t) = \frac{1}{1+e^{-t}}$$

of Formula 3, when t is a complex number, if $t=e^{j(2n+1)\pi}$ (n is an integer), f(t) is 0 and cannot be differentiated. Accordingly, an activate function, which is generally used in a real neural network, is not applicable to a complex value neural network without constraints. Furthermore, according to Liouville's theorem, if a function is differentiable and bounded in the complex domain, it may be merely a constant function, and the Liouville's theorem may be described as in Table 7 below.

TABLE 7

Liouville's theorem: every bounded entire function must be constant. That is, every holomorphic function f for which there exists a positive number M such that for all z in C is constant Proof) If f is an entire function, it can
be represented by Taylor series about 0: where and Cr is circle about 0 of radius r>0. Suppose f is bounded: i.e. there exists a constant M such that for all z.

As an example, based on Table 7, Formula 10 below may be derived by the Liouville's theorem.

$$|a_k| \le \frac{1}{2\pi}\oint_{C_r}\frac{|f(\zeta)|}{|\zeta|^{k+1}}|d\zeta| \le \frac{1}{2\pi}\oint_{C_r}\frac{M}{r^{k+1}}|d\zeta| = \frac{M}{2\pi r^{k+1}}\oint_{C_r}|d\zeta| = \frac{M}{2\pi r^{k+1}}2\pi r = \frac{M}{r^k}$$ [Formula 10]

Here, if r approaches infinite, then $a_k=0$ for $k \ge 1$. Accordingly, f(z)=a0. However, it may be meaningless to use a constant function as an activate function of a neural network. Accordingly, the properties described in Table 8 may be necessary for a complex activation function f(z) which is made possible by backpropagation.

TABLE 8

Complex activation function, f(z) = u(x,y)+jv(x,y), properties for backpropagation
   f(z) is non-linear in x and y
   f(z) is bounded
   The partial derivatives, $u_x$, $u_y$, $v_x$ and $v_y$ exist and are bounded f(z) is not entire In case the properties described in Table 8 are satisfied, a complex activation function may have a form represented by Formula 11 below.

$$f_{c \to c}(z) = f_R(Re(z)) + jf_I(Im(z))$$ [Formula 11]

Here, an activate function like "sigmoid function" and "hyperbolic tangent function" used in a real neural network may be used for fR and fI.

Types of Neural Networks

Convolution Neural Network (CNN)

CNN may be a type of neural networks that are normally used for voice recognition or image recognition but not limited thereto. As CNN is configured to process multi-dimensional array data, it is specified in processing a multi-dimensional array like a color image. Accordingly, techniques using deep learning for image recognition may be mostly implemented based on CNN. As an example, a normal neural network processes image data as it is. That is, since an entire image is input as a single piece of data, the feature of the image is hard to find and the desired performance may not be achieved when the image changes its position only a little or becomes distorted as described above.

On the other hand, CNN can process an image not as a single piece of data but by dividing it into multiple pieces. Based on what is described above, CNN can extract a partial feature of an image, even when the image is distorted, and thus desired performance can be achieved. CNN may be defined by the following terms in Table 9.

TABLE 9

Convolution :
   The convolution operation means the integral of the product between two functions f and g, where one of the functions is reversed and shifted. In the discrete domain, summation is used in place of integration.
Channel :
   This means the number of data arrays constituting an input or output, when convolution is performed.
Filter/kernel :
   This means a function of convolution for input data and is also called kernel.
Dilation:
   This means the spacing between data, when convolution with data is performed. In case of dilation = 2, each dilation is extracted every two pieces of data to perform convolution with kernel.
Stride :
   This means the interval of shifting a filter/kernel during convolution.
Padding :
   This means an operation of attaching a specific value (usually 0) to input data during convolution.
Feature map:
   This means the output of convolution.

Recurrent Neural Network (RNN)

Figure 26:
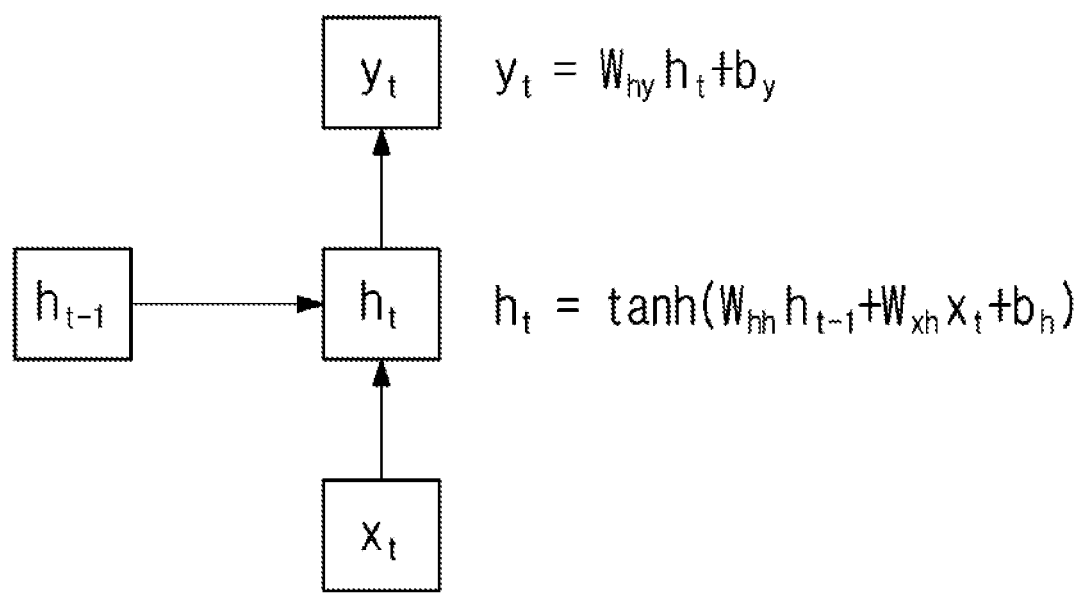
FIG. 26 is a view showing a learning model based on a RNN applicable to the present disclosure.

FIG. 26 is a view showing a learning model based on a RNN applicable to the present disclosure. Referring to FIG. 26, RNN may be a type of directed cycle artificial neural networks with hidden nodes connected with directional edges. As an example, RNN may be a suitable model for processing sequential data like voices and characters. One of the advantages of RNN is that various and flexible structures can be made as necessary since RNN has a network structure capable of accepting inputs and outputs irrespective of the length of sequences. As an example, in FIG. 26, ht (t=1, 2, . . . ) may represent a hidden layer, and x and y may represent an input and an output respectively. In case relevant information is distant from a point that uses the information, the gradient is gradually reduced during back-propagation so that RNN may have degraded learning performance, which is called the problem of "vanishing gradient". As an example, the long-short term memory (LSTM) and the gated recurrent unit (GRU) may be structures that have been proposed to solve the "vanishing gradient" problem. That is, as compared with CNN, RNN may be a structure with feedback.

Autoencoder

Figure 27:
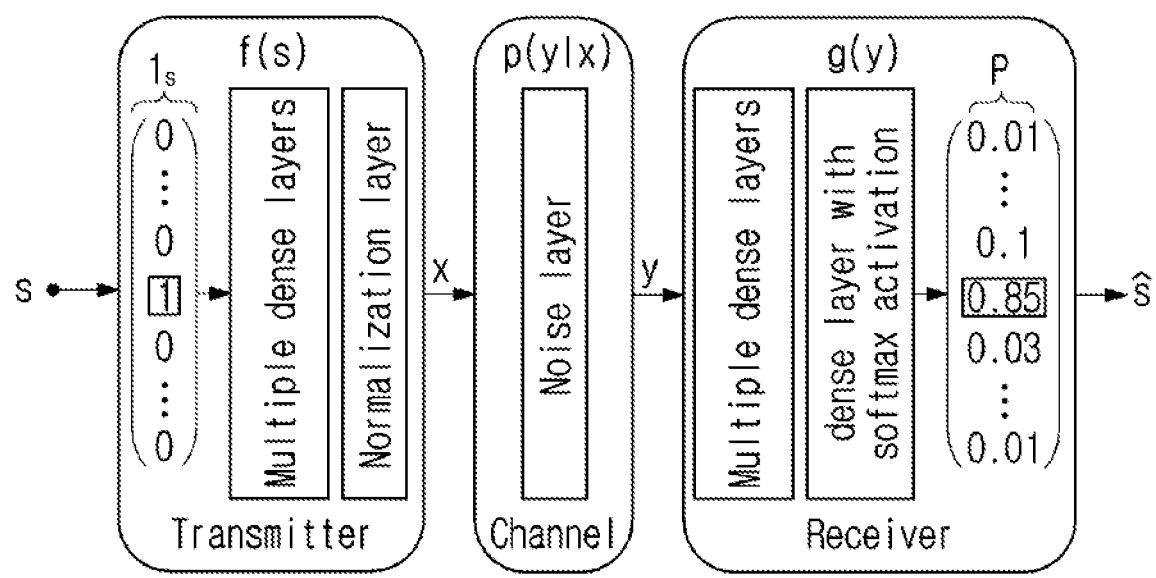
FIG. 27 is a view showing an autoencoder applicable to the present disclosure.

FIG. 27 is a view showing an autoencoder applicable to the present disclosure. Referring to FIG. 27, various attempts are being made to apply a neural network to a communication system. Herein, as an example, an attempt to apply a neural network to a physical layer focuses mainly on optimizing a specific function of a receiver. As a concrete example, in case a channel decoder is configured as a neural network, the performance of the channel decoder may be improved. As another example, in a MIMO system with a plurality of transmission/reception antennas, when a MIMO detector is configured as a neural network, the performance of the MIMO system may be improved.

As another example, an autoencoder method may be applied. Herein, the autoencoder may be configured as shown in FIG. 27 and improve the performance by configuring both the transmitter and the receiver as a neural network and performing optimization from the end-to-end perspective.

Figure 28:
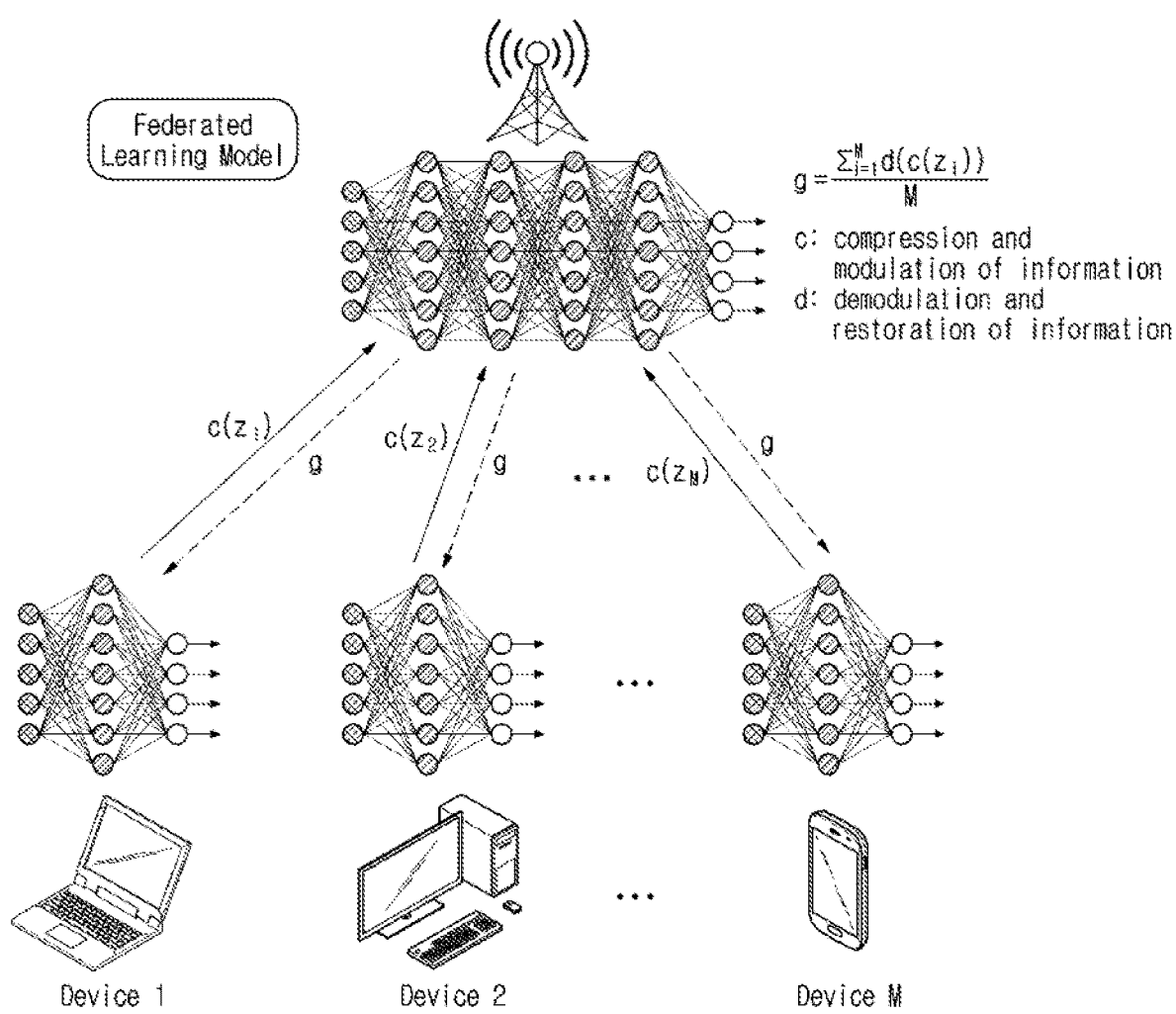
FIG. 28 is a view showing a federated learning method based on a compression method applicable to the present disclosure.

FIG. 28 is a view showing a federated learning method based on a compression method applicable to the present disclosure.

As an example, described above, an artificial intelligence or machine learning may be applied to a new communication system. Herein, as an example, a model parameter of federated learning may be applied to a new communication system. Hereinafter, a method and system for transmitting a signal by applying a model parameter of federated learning will be described.

As an example, federated learning may be applied to any one of the privacy protection of individuals, the load reduction of a base station through distributed processing, and the reduction of traffic between a base station and a terminal. However, federated learning may not be limited thereto. Herein, as an example, the traffic of a local model parameter (e.g., weight and information of a deep neural network) may place a large burden on a wireless communication system. In consideration of what is described above, techniques are being developed to reduce traffic through the compression or AirComp (Over the Air Computing) of local model parameters.

However, a communication system may have various wireless communication environments. In addition, various numbers of terminals requiring learning may be set in a communication system. Herein, in consideration of the above-described environment, a communication system may need not a fixed specific technique but a flexible operation method and system. Thus, the resource efficiency of a communication system may be enhanced, and in consideration of what is described above, a method of applying federated learning will be described below.

Herein, the above-described federated learning through AirComp may be a method of combining terminal model parameters. As an example, in case transmission is performed based on the AirComp method, as a wireless communication channel performs signal transmission based on superposition, the transmission efficiency may be enhanced and the load of a base station may be reduced. In addition, terminals may share a same communication channel. Accordingly, when there is a plurality of terminals, transmission efficiency may be enhanced. However, a load may occur to weight calculation for supporting AirComp for each terminal. In addition, in case transmission is performed through AirComp, since the signaling method transmits a model parameter without compression, efficiency may rather be degraded when a small number of terminals are used.

In consideration of what is described above, a federated learning method through terminal model parameter compression may be a method by which each terminal performs compression of data by considering a feature of a parameter and then transmits compressed data to a base station. Accordingly, in case a base station receives a signal based on a federated learning method, the base station may perform decompression based on the received signal and need to perform an operation of combining collected parameters. Accordingly, the load of the base station may increase. In addition, as an example, since a communication channel should be allocated to each terminal, communication traffic may increase in proportion to the number of terminals that are used. Accordingly, in case there is a plurality of terminals, a method using compression may decrease efficiency.

Herein, as an example, in case a weight signaling method is fixedly used in a federated learning method, efficiency may be different based on a radio environment. As an example, efficiency may be high in a specific environment, while efficiency may decrease in an opposite case. Herein, as a radio environment can change flexibly, it is necessary to recognize a radio environment, which can flexibly change, and to select a technique based on the recognized radio environment. Hereinafter will be described an operation based on the above description for enhancing the efficiency of radio environment.

As an example, each terminal may deliver, to a base station, a parameter (e.g., weight of a deep neural network, information) of a model that is learned based on a federated learning method. As an example, referring to FIG. 28, each terminal may deliver a compressed parameter, and a base station may update a global model based on Formula 12 below. Here, c may be information compression and modulation processing, and d may be demodulation and information restoration processing. Then, the base station may deliver an updated global model to each terminal.

$$g = \frac{\sum_{i=1}^{M} d(c(z_i))}{M} \qquad \text{[Formula 12]}$$

Specifically, each terminal may perform compression based on a method of minimizing an amount of model parameters. As an example, in FIG. 28, each terminal uses a same compression algorithm but is not limited thereto.

As an example, compression may be performed based on at least any one of weight pruning, quantization, and weight sharing. In addition, as an example, compression may be performed based on other methods and is not limited to the above-described embodiment. Herein, in case compression is performed based on an existing neural network, a value necessary for actual interference, among weights, may be resistant to small values. That is, a weight necessary for actual interference may have only a little effect on small values. In consideration of what is described above, weight pruning may set every small weight to 0. Thus, a neural network may reduce a network model size. In addition, as an example, quantization may be a calculating method that reduces data to a specific bit number. That is, data may be expressed only by a specific quantized value. In addition, as an example, weight sharing may be a method of adjusting weights based on an approximate value (e.g., codebook) and sharing it. Herein, in case a signal is transmitted in a network, only a codebook and an index for the value may be shared in the information.

Based on any one of the above-described methods, each terminal may perform compression of data and transmit compressed information to a base station. Herein, the base station may receive the compressed [ c(z)] _k) from each terminal and calculate and update a parameter of a global model by decompressing received information.

Herein, each terminal may set a local model parameter with an individual feature. Accordingly, in case each terminal performs compression, the compression efficiency may be different according to each terminal. In addition, as an example, each terminal may have a different hardware resource. Herein, the compression efficiency may be affected by a hardware resource. Accordingly, each terminal may have a different compression efficiency.

As a concrete example, in case a terminal performs quantization with 8 bits, a terminal with a 64-bit operation processing function may acquire a high compression efficiency. On the other hand, a terminal with a 16-bit operation processing function may have a low compression efficiency. In addition, as an example, in case a terminal is equipped with low-end hardware, the terminal may be subject to a large compression load. Accordingly, using a simple compression technique may be advantageous to the terminal. As an example, as an Internet of Thing (IoT) terminal or low-power terminals may be equipped with relatively low-end hardware, a simple compression technique may be used. On the other hand, as a terminal operating based on an AI or a terminal processing a massive amount of data may be equipped with high-end hardware, a complicated compression technique may be used to enhance compression efficiency. That is, a different compression method may be used according to each terminal, and it may be necessary to use a compression method suitable for each terminal.

In consideration of what is described above, each terminal may use a compression method suitable for an individual feature of a local model parameter and a hardware resource. Herein, terminals may need to deliver information on a compression method to a base station. Based on information received from each terminal, a base station may restore compressed data and a model parameter that are received from each terminal.

Figure 29:
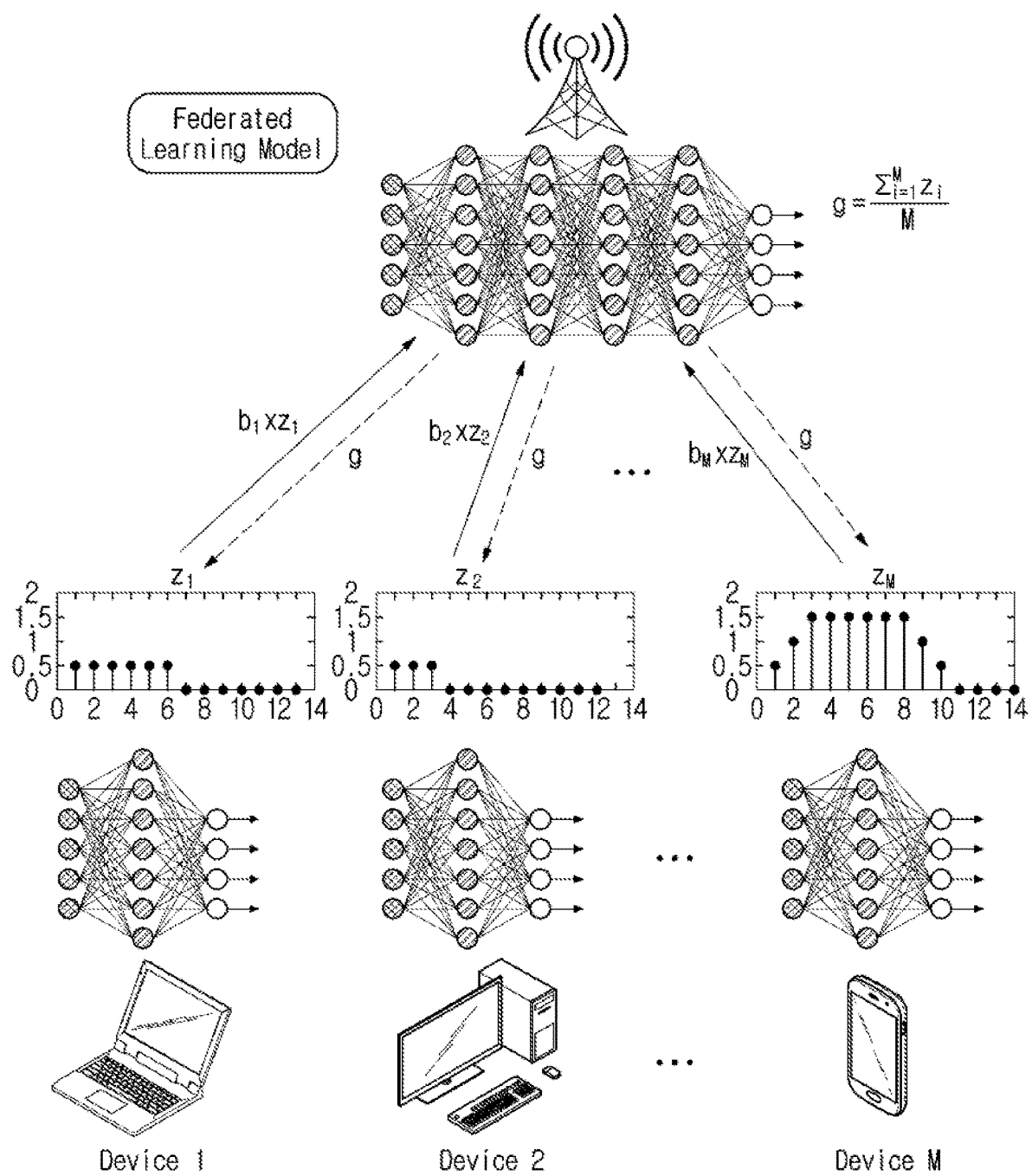
FIG. 29 is a view showing a federated learning method using an AirComp applicable to the present disclosure.

FIG. 29 is a view showing a federated learning method using an AirComp applicable to the present disclosure.

Referring to FIG. 29, a network model based on an AirComp method may be configured between a plurality of terminals and a base station. As an example, an AirComp method may be a technique that combines communication and computation by using the superposition principle of radio channels.

Specifically, a plurality of terminals may apply a delivered weight considering a channel environment to distributed data (e.g., model parameters). Then, the plurality of terminals may superpose corresponding data at a same time slot and transmit the data to the base station. At this time, the base station may receive superposed data in a radio channel environment and store the data. Then, the base station may update a parameter of a global mode based on the received data. Herein, the base station may not separately perform an aggregating operation for each piece of data. In addition, since the plurality of terminals use a same resource, the efficiency of a communication resource may be high. As an example, a signal received by the base station may be expressed by Formula 13 below.

Here, hi may be a communication channel of a terminal i, bi may be a terminal weight, a may be a base station weight, and n may be a white noise with variance σ2.

Based on Formula 13 below, the base station may determine a transmission weight bi and a reception weight a, which minimize MSE($\hat{g}$, g). Then, the base station may update a global model g based on weights thus derived.

$$\hat{g}=a(\Sigma_{u=1}^{M}h_i b_i z_i + n)$$ [Formula 13]

Figure 30:
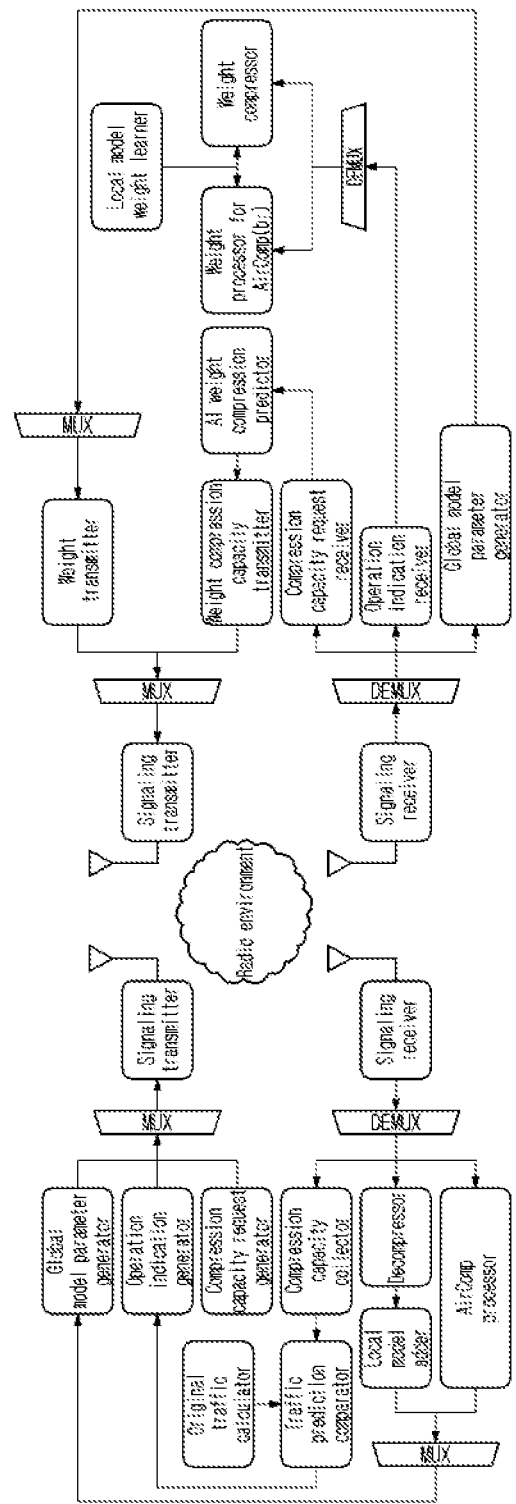
FIG. 30 is a view showing a terminal and a base station which are applicable to the present disclosure.

FIG. 30 is a view showing a terminal and a base station which are applicable to the present disclosure.

As described above, a base station and a plurality of terminals may constitute a network based on a federated learning method. Herein, as an example, a base station and a terminal may include a signaling transmitter and a receiver and respective transmitting and receiving roles for wireless communication. That is, a base station and a terminal may transmit and receive data between them.

As an example, referring to FIG. 30, a base station may deliver a request for each compression capacity to a terminal through a compression capacity request generator. Herein, the terminal may recognize the request through a compression capacity receiver. In addition, the terminal may predict a compression capacity through an AI weighted compression predictor. Then, the terminal may deliver the predicted compression capacity to the base station through a weighted compression capacity transmitted. Herein, the base station may obtain information on each predicted compression capacity from the plurality of terminals. A compression capacity collector of the base station may collect and aggregate compression capacities of terminals and then deliver the compression capacities to a traffic prediction comparator. Then, the traffic prediction comparator of the base station may compare compression traffic and AirComp traffic predicted in an original traffic calculator and determine a delivery method. That is, the traffic prediction comparator of the base station may determine a most efficient delivery method based on compression and original traffic. Then, the base station may provide information on the determined delivery method to a terminal. As a concrete example, an operation indication generation of the base station may indicate a data delivery method to a terminal.

Herein, a terminal may be operated based on delivery method information received from the base station. Specifically, the terminal may recognize a delivery method through an operation indication receiver. Then, the terminal may process a local model parameter based on the above-described delivery method information. Specifically, a local model weight learner of the terminal may process a local model parameter according to an operation indication.

As an example, in case the operation indication is a compression method, the terminal may compress data based on the compression method and deliver the compressed data to the base station.

As another example, in case the operation indication is an AirComp method, the terminal may transmit data by using an AirComp weight. Specifically, a weight processor for AirComp of the terminal may multiply data by an AirComp weight, and a weight compressor may compress data. Then, the terminal may deliver processed data to the base station. Specifically, processed data may be delivered to the base station through a weight transmitter of the terminal.

Then, the base station may update a global model parameter by releasing and accumulating a local model parameter based on the indicated operation method. Specifically, in case the indicated operation method is a compression method, the base station may release and accumulate a compressed local model parameter through a decompressor and a local model adder. On the other hand, in case the indicated operation method is an AirComp method, the base station may process received data through an AirComp processor and release and accumulate a local model parameter.

Herein, the base station may deliver each updated global model parameter to a terminal. Specifically, a global model parameter generator of the base station may deliver a global model parameter to a terminal. A terminal may receive a new global model parameter transmitted by the base station and update a local model weight. Specifically, a terminal may receive a new global model parameter through a global model parameter receiver. Then, the terminal may update a global model parameter through a local model weight learner. Then, the terminal may operate as a new global model.

Figure 31:
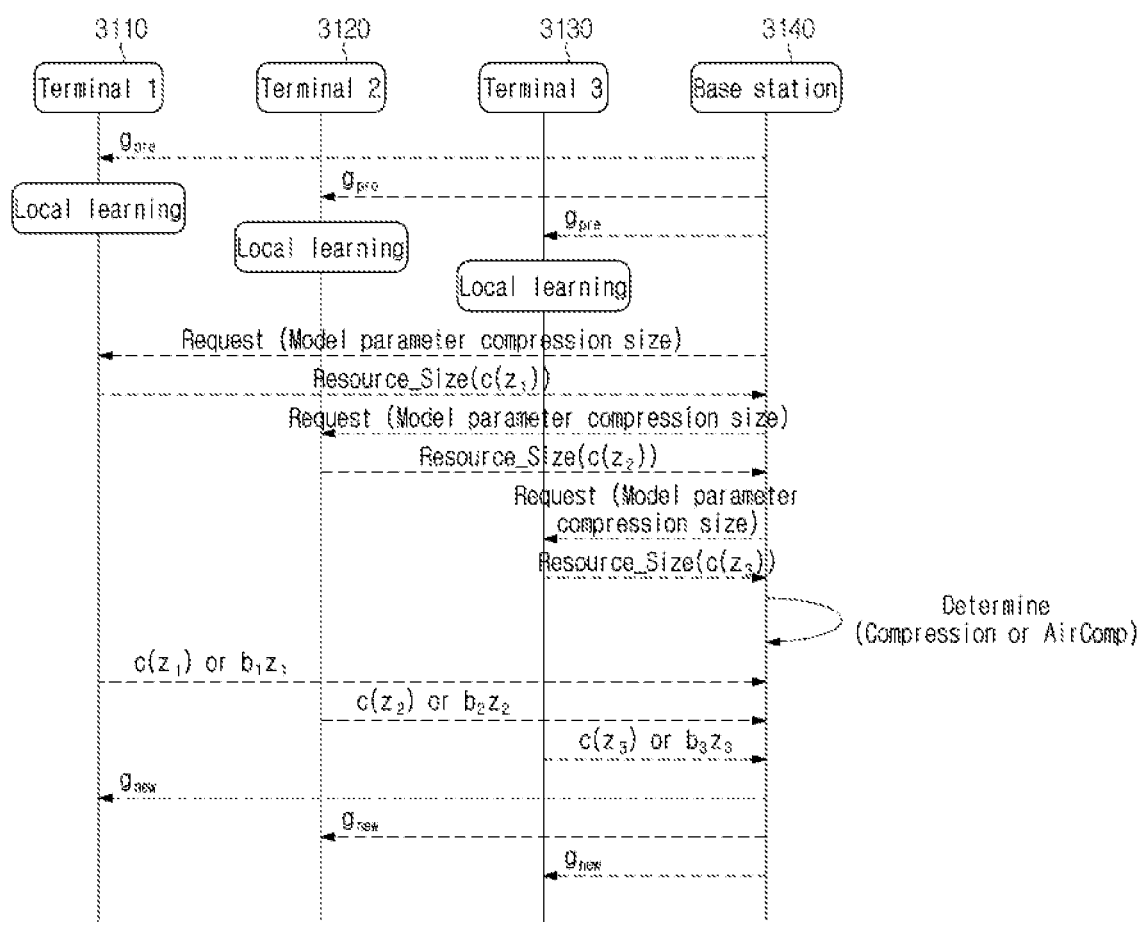
FIG. 31 is a view showing a method of determining compression or AirComp applicable to the present disclosure.

FIG. 31 is a view showing a method of determining compression or AirComp applicable to the present disclosure.

Referring to FIG. 31, a base station 3140 may deliver an existing global parameter to respective terminals 3110, 3120 and 3130. Then, each of the terminals 3110, 3120 and 3130 may perform local learning based on the global parameter. Herein, the base station 3140 may request information on a model parameter compression size to each of the terminals 3110, 3120 and 3130. Herein, the information on a model parameter compression size may be size information for a case in which each of the terminals 3110, 3120 and 3130 optimally compresses a model parameter that it learns. Then, each of the terminals 3110, 3120 and 3130 may receive information on a model parameter compression size based on a request of the base station 3140. Based on information received from each of the terminals 3110, 3120 and 3130, the base station 3140 may compare, for each terminal, an aggregate total of model parameter compression sizes and a size obtained by using AirComp. As an example, since the sizes compared based on the above description is related directly to the traffic of a radio communication channel, a transmission scheme with low traffic may be determined. As an example, the base station 3140 may determine a transmission scheme based on Formula 14 below. That is, the base station 3140 may determine any one of compression and AirComp based on Formula 14.

$$\sum_{i=1}^{M} \text{Resource\_Size}(c_i(z_i)) \geq \text{Resource\_Size}(b_i z_i) \quad \text{[Formula 14]}$$

As another example, Formula 14 described above may be determined based on a model parameter compression size but further reflect receiving performance and other information. As an example, the base station 3140 may determine a transmission scheme based on not only information on a compression size but also other information and is not limited to the above-described embodiment.

In case the base station 3140 determines a transmission scheme, the base station 3140 may deliver information on the determined transmission scheme to each of the terminals 3110, 3120 and 3130. As an example, the transmission scheme may be any one of compression and AirComp. Then, each of the terminals 3110, 3120 and 3130 may transmit a model parameter to the base station 3140 based on transmission scheme information delivered to it. As an example, in case the transmission scheme is compression, each of the terminals 3110, 3120 and 3130 may transmit a compressed model parameter to the base station 3140 through a communication channel occupied by each of the terminals 3110, 3120 and 3130.

In addition, as an example, in case the transmission scheme is an AirComp method, each of the terminals 3110, 3120 and 3130 may transmit an unprocessed model parameter by sharing a same communication channel. That is, each of the terminals 3110, 3120 and 3130 may transmit each model parameter without processing it based on the superposition principle at a same time slot. Then, the base station 3140 may generate and update a global model parameter based on received data. Then, the base station 3140 may transmit an updated global model parameter to each of the terminals 3110, 3120 and 3130.

Figure 32:
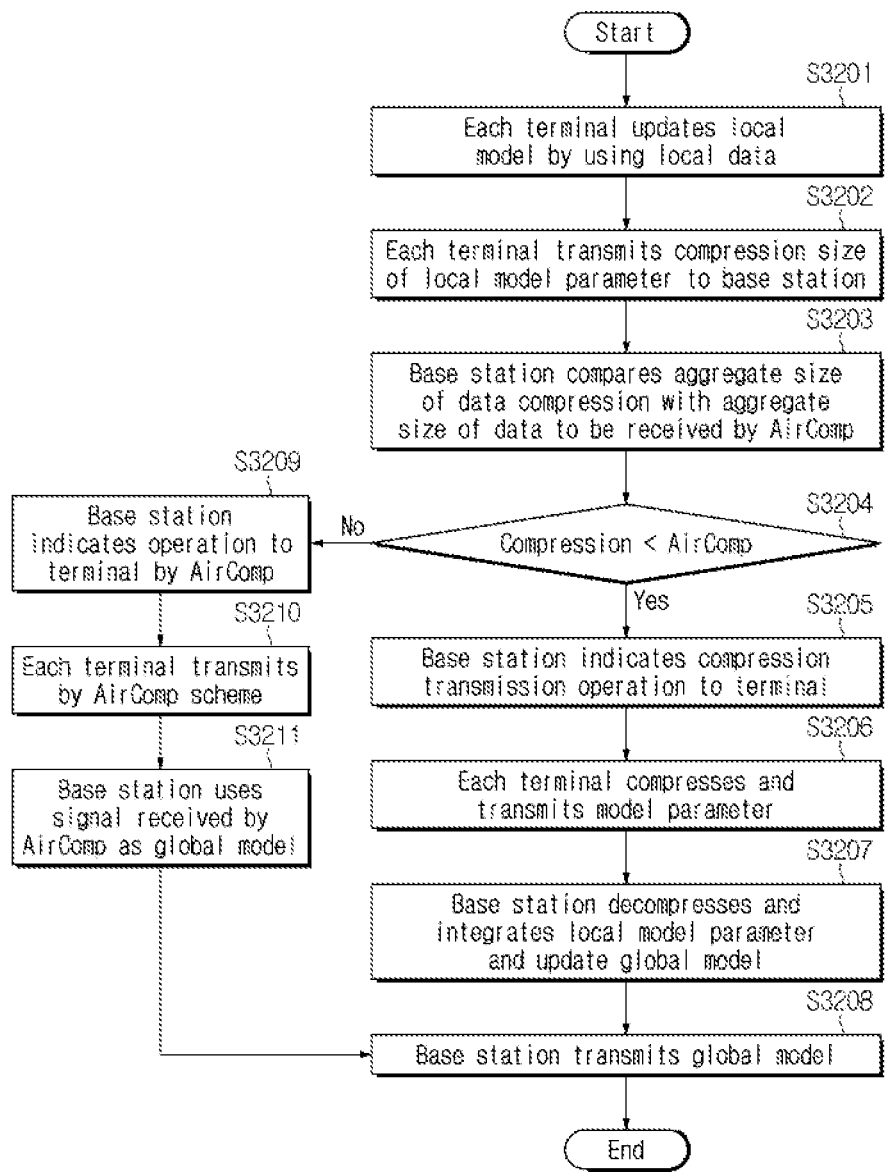
FIG. 32 is a flowchart showing a method of determining compression or AirComp applicable to the present disclosure.

As an example, FIG. 32 is a flowchart showing a method of determining compression or AirComp applicable to the present disclosure.

Referring FIG. 32, as described above, each terminal may update a local model by using local data (S3201). Next, each terminal may transmit compression size information of a local model parameter to a base station (S3202). Based on compression size information received from each terminal, the base station may compare an aggregate of compression sizes for each terminal and an aggregate size of data to be received by AirComp and may use the above-described Formula 14 (S3203). Next, the base station may determine a transmission scheme based on the above-described compared values (S3204). Herein, in case, for each terminal, an aggregate compression size is smaller than an aggregate size of data to be received by AirComp, the base station may indicate a compression transmission operation to each terminal (S3205). That is, the base station may select a transmission scheme with a smaller data size.

As another example, the base station may further consider other information. As an example, the base station may further consider performance information. As an example, in case the base station receives compression size information of a local parameter from a terminal, the base station may further receive channel state information for each terminal. Herein, the base station may determine a transmission scheme by considering channel state information for each terminal. As a concrete example, the channel state information for each terminal may be utilized as weight information in Formula 14 described above. As an example, a corresponding weight may be reflected in information on data compression size. As an example, in case the channel state is not good, the above-described weight information may be set to increase an aggregate total of model parameter compression sizes of each terminal. That is, in the above-described Formula, the aggregate total of model parameter compression sizes for each terminal may be multiplied by a predetermined value of weight. As an example, in case the channel state is not good, in Formula 14 described above, an aggregate total of model parameter compression sizes for each terminal may be multiplied by a weight so that the aggregate total of model parameter compression sizes for each terminal can increase. Accordingly, in case the channel state is not good, the base station is more likely to select an AirComp transmission scheme. That is, a weight for channel state information may be utilized for the base station to determine a transmission scheme based on the above-described Formula 14. However, this is merely one example, the present disclosure is not limited to the above description.

On the other hand, in case the channel state is good, the compression size of corresponding data may be set to be maintained or to become smaller. As an example in case the channel state is equal to or greater than a reference value, a weight may be 1. On the other hand, in case the channel state is less than a reference value, a weight becomes a value exceeding 1 so that the compression size of data may increase. Thus, the above-described data compression size may increase, and the base station may reflect channel state information by comparing the data compression size and an aggregate size of data to be received by AirComp. However, this is merely one example, and the present disclosure is not limited to the above-described embodiment.

Meanwhile, based on a compression scheme, which is an operation method indicated by the base station, each terminal may compress a model parameter and transmit it to the base station (S3206). Next, the base station may decompress and integrate local model parameters. The base station may update a global model based on integrated information (S3207). Next, the base station may transmit the updated global model to each terminal (S3208).

As another example, in case, for each terminal, an aggregate compression size is not smaller than an aggregate size of data to be received by AirComp, the base station may indicate an AirComp transmission operation to each terminal (S3209). That is, the base station may select a transmission scheme with a smaller data size. Next, each terminal may transmit an unprocessed local mode parameter to the base station based on an AirComp scheme (S3210). Next, the base station may use a signal received by the AirComp scheme as a global model (S3211). Next, the base station may update a global model based on corresponding information and transmit information on the updated global model to each terminal (S3208).

Based on what is described above, a base station and a terminal may support both a compression function and an AirComp function. As an example, when there are many terminals, AirComp transmission may be more advantageous than compression transmission. On the other hand, when there is a small number of terminals, compression transmission may be more advantageous than AirComp transmission. As an example, since a radio environment may flexibly change, a base station and a terminal may flexibly configure a transmission method, thereby maintaining efficiency in a wireless communication environment.

Figure 33:
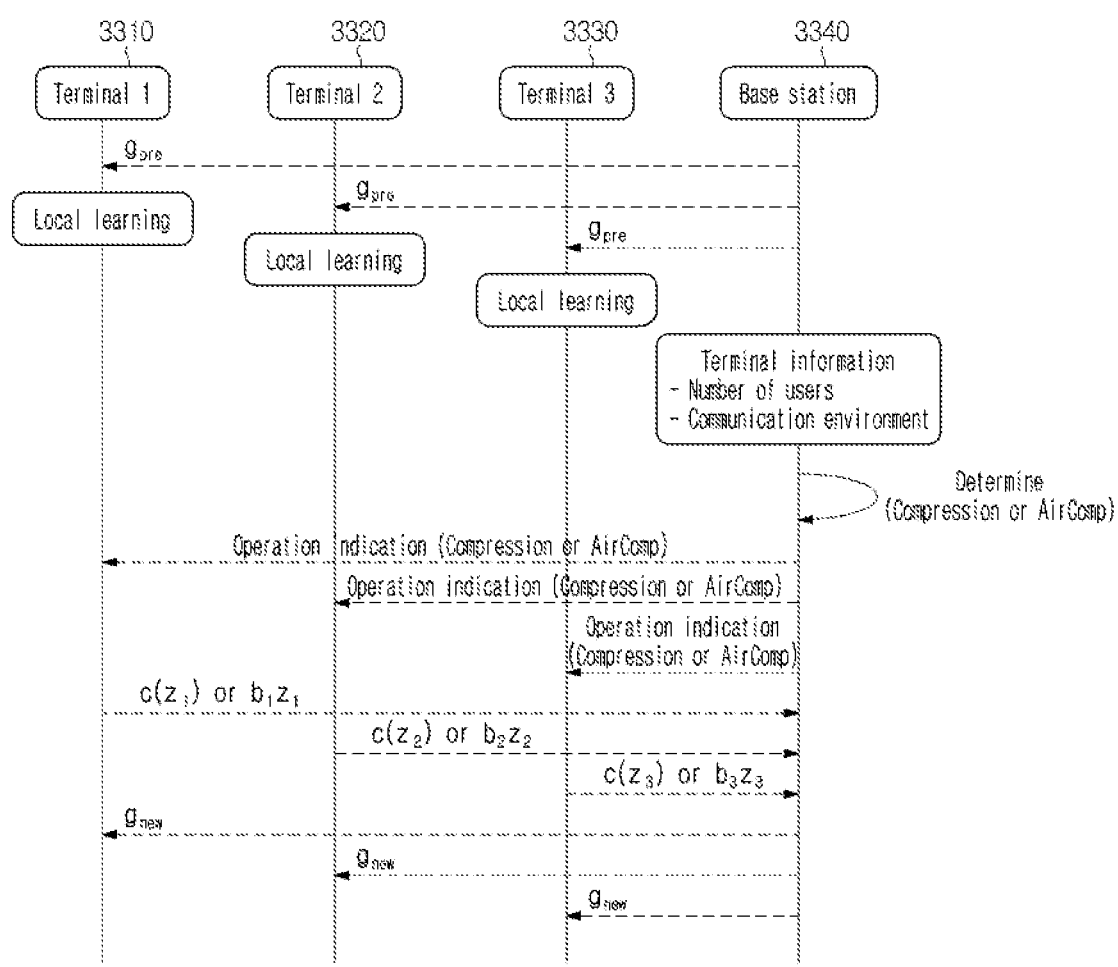
FIG. 33 is a view showing a method of determining a transmission method based on the number of terminals applicable to the present disclosure.

FIG. 33 is a view showing a method of determining a transmission method based on the number of terminals applicable to the present disclosure.

Referring to FIG. 33, a base station 3340 may deliver an existing global parameter to respective terminals 3310, 3320 and 3330. Then, each of the terminals 3310, 3320 and 3330 may perform local learning based on the global parameter. Herein, in FIG. 31 and FIG. 32 described above, the base station 3340 may request information on a model parameter compression size to each of the terminals 3310, 3320 and 3330 and receive the information. Thus, efficiency may be maximized by reflecting a data feature of each of the terminals 3310, 3320 and 3330.

However, as an example, in order to generate feature information for a model parameter, a load of a terminal may occur, and a protocol may need to be added. In consideration of what is described above, the base station 3340 may determine a transmission scheme based on information that is already stored. That is, the base station 3340 may transmit a request message for a data size to each of the terminals 3310, 3320 and 3330 and determine a transmission scheme without an operation of receiving information on it. Thus, the base station 3340 may perform efficient federated learning transmission without any further load and protocol.

As a more concrete example, the base station 3340 may determine a transmission scheme by using information on each terminal. As an example, the information on each terminal may include information on the number of terminals. As another example, the information on each terminal may include information on a communication environment.

As another example, the information on each terminal may be terminal type information. As an example, among terminals, a terminal, which transmits a small amount of data based on low power, and a terminal, which uses a large amount of data based on high power, may belong to different types. Herein, the base station 3340 may obtain information on a terminal type beforehand and determine a transmission scheme by further considering terminal type information. As another example, information on each terminal may include terminal ability information. As an example, as described above, a terminal may be a terminal that uses high-end hardware with good compression efficiency. On the other, a terminal may be a terminal that uses low-end hardware with bad compression efficiency. Herein, the above-described information may be terminal ability information and be delivered to the base station 3340 in advance. As an example, while the base station 3340 and each of the terminals 3310, 3320 and 3330 perform pairing or connection, terminal ability information may be delivered to the base station 3340. That is, the base station 3340 may know ability information of each of the terminals 3310, 3320 and 3330 in advance and determine a transmission scheme by using the information. In addition, as an example, the base station 3340 may determine a transmission scheme by further using other information, but the present disclosure is not limited to the above-described embodiment.

The base station 3340 may determine a transmission scheme based on any one of the above-described pieces of information. As a concrete example, the base station may not request any further information on a terminal but determine a transmission scheme by using information that it already has (e.g., the number of users, communication environment), and the information that the base station already has may be the same as described above but is not limited thereto. Herein, the base station may determine a transmission scheme based on Formula 15 below. As an example, Formula 15 below may be written by using a reference value (learned empirical value or calculated value) for each piece of information. As an example, Formula 14 below may be a formula that is set based on the number of terminals. Herein, as an example, c may be a compression value, gpre may be a global model parameter that is currently being used, and bi may be a delivery weight.

$$N \text{ vs } N_{th}, N_{th} = \frac{\text{Resource}_{Size(b_i g_{pre})}}{\text{Resource}_{Size(c(g_{pre}))}} \quad \text{[Formula 15]}$$

Herein, the base station 3340 may use gpre, which is currently being used, and an AirComp delivery weight of a terminal, which was used before, to obtain a reference value Nth. As an example, the delivery weight bi may be a value, which the base station calculates and transmits to a terminal, and be information that the base station already has. That is, Formula 16 described above may reflect the increase of transmitted data caused by an AirComp delivery weight bi.

In addition, as an example, the reference value Nth may represent a compression ratio. That is, it may mean the number of users where an AirComp scheme and a compression scheme have the same traffic. Herein, if N>Nth, an AirComp transmission scheme may be used. On the other hand, if N<Nth, a compression transmission scheme may be used.

Then, in case the base station 3340 determines a transmission scheme, the base station 3340 may deliver information on the determined transmission scheme to each of the terminals 3310, 3320 and 3330. As an example, the transmission scheme may be any one of compression and AirComp. Then, each of the terminals 3310, 3320 and 3330 may transmit a model parameter to the base station 3340 based on transmission scheme information delivered to it. As an example, in case the transmission scheme is compression, each of the terminals 3310, 3320 and 3330 may transmit a compressed model parameter to the base station 3340 through a communication channel occupied by each of the terminals 3310, 3320 and 3330.

In addition, as an example, in case the transmission scheme is an AirComp method, each of the terminals 3310, 3320 and 3330 may transmit an unprocessed model parameter by sharing a same communication channel. That is, each of the terminals 3310, 3320 and 3330 may transmit each model parameter without processing it based on the superposition principle at a same time slot. Then, the base station 3340 may generate and update a global model parameter based on received data. Then, the base station 3340 may transmit an updated global model parameter to each of the terminals 3310, 3320 and 3330.

Figure 34:
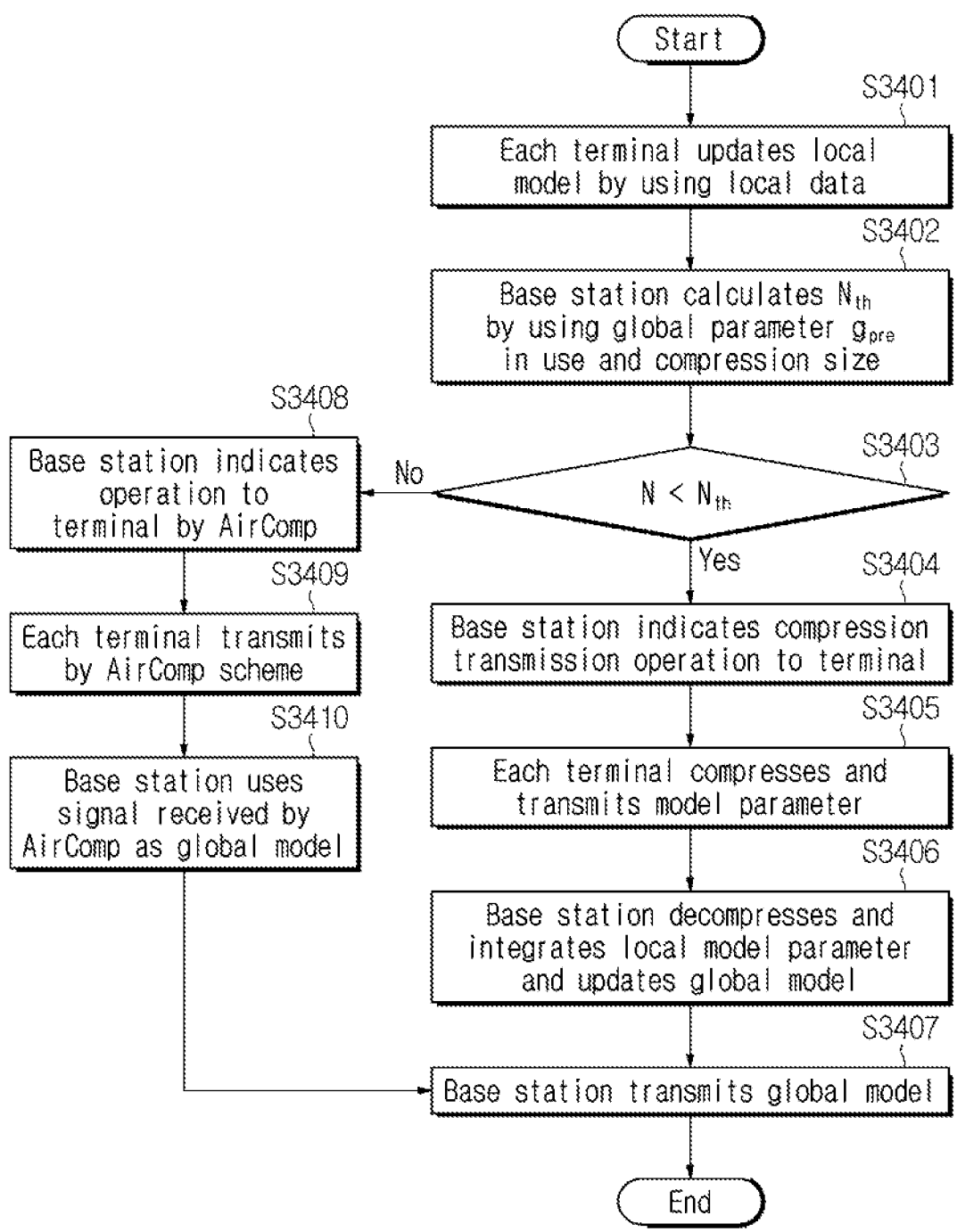
FIG. 34 is a flowchart showing a method of determining a transmission method based on the number of terminals applicable to the present disclosure.

As an example, FIG. 34 is a flowchart showing a method of determining compression or AirComp applicable to the present disclosure.

Referring FIG. 34, as described above, each terminal may update a local model by using local data (S3401). Next, a base station may calculate Nth by using a global parameter in use gpre and a compression size, and this may be the same as shown in FIG. 33 (S3402). Herein, the base station may compare N and Nth (S3403). As an example, if N<Nth, the base station may select a compression transmission scheme. Next, the base station may indicate a compression transmission scheme operation to each terminal (S3404). Meanwhile, based on a compression scheme, which is an operation method indicated by the base station, each terminal may compress a model parameter and transmit it to the base station (S3405). Next, the base station may decompress and integrate local model parameters. The base station may update a global model based on integrated information (S3406). Next, the base station may transmit the updated global model to each terminal (S3407).

On the other hand, if N>Nth, the base station may use an AirComp transmission. Herein, the base station may indicate an AirComp transmission operation to each terminal (S3408). Next, each terminal may transmit an unprocessed local mode parameter to the base station based on an AirComp scheme (S3409). Next, the base station may use a signal received by the AirComp scheme as a global model (S3410). Next, the base station may update a global model based on corresponding information and transmit information on the updated global model to each terminal (S3407).

Based on what is described above, a base station and a terminal may support both a compression function and an AirComp function. As an example, when there are many terminals, AirComp transmission may be more advantageous than compression transmission. On the other hand, when there is a small number of terminals, compression transmission may be more advantageous than AirComp transmission. As an example, since a radio environment may flexibly change, a base station and a terminal may flexibly configure a transmission method, thereby maintaining efficiency in a wireless communication environment.

Figure 35:
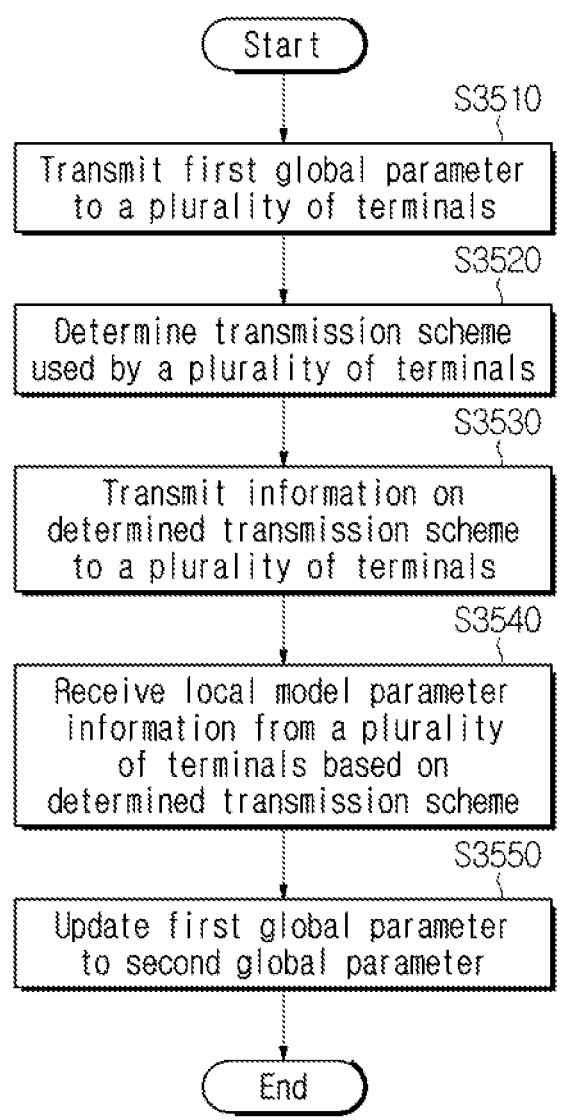
FIG. 35 is a view showing an operation method that is applicable to the present disclosure.

FIG. 35 is a view showing an operation method that is applicable to the present disclosure.

Referring to FIG. 35, a base station may transmit a first global parameter to a plurality of terminals (S3510). Herein, as described in FIG. 28 to FIG. 34, the first global parameter may be an existing global parameter. Next, the base station may determine a transmission scheme used by the plurality of terminals (S3520). As an example, as described in FIG. 28 to FIG. 34, since there may be various communication environments, various transmission schemes may be determined based on a federated learning method. As an example, any one of a compression transmission scheme and an AirComp transmission scheme may be used as a transmission scheme. Next, the base station may transmit information on a determined transmission scheme to the plurality of terminals (S3530). Next, the base station may receive local model parameter information from the plurality of terminals based on the determined transmission scheme (S3540). Next, the base station may update the first global parameter to a second global parameter (S3550). Herein, as described in FIG. 28 to FIG. 34, the second global parameter may be a new global parameter.

In addition, as an example, when the base station determines a transmission scheme, as in FIG. 31 and FIG. 32 described above, the base station may request local model parameter compression size information to the plurality of terminals. Next, based on the request, the base station may receive local model parameter compression size information from each of the plurality of terminals. Next, based on the local model parameter compression size information received from each of the plurality of terminals, the base station may check an aggregate total of local model parameter compression sizes for the plurality of terminals. The base station may compare the aggregate total of local model parameter compression sizes for the plurality of terminals and a size based on AirComp, which may be the same as described in Formula 14 above.

Herein, as an example, in case the aggregate total of local model parameter compression sizes for the plurality of terminals is larger than the size based on AirComp, the base station may determine an AirComp transmission scheme as a transmission scheme to be used by the plurality of terminals.

In addition, as an example, in case the plurality of terminals transmit a local model parameter based on the AirComp transmission scheme, the plurality of terminals may transmit each local model parameter at a same time slot. That is, the plurality of terminals may transmit information on each local model parameter to the base station at a same resource based on the superposition principle. Based on the superposition principle, the base station may identify a local model parameter transmitted from each of the plurality of terminals and thus update a global parameter.

In addition, as an example, in case the aggregate total of local model parameter compression sizes for the plurality of terminals is equal to or smaller than the size based on AirComp, the base station may determine a compression transmission scheme as a transmission scheme to be used by the plurality of terminals. Herein, in case the plurality of terminals transmit a local model parameter based on the compression transmission scheme, the plurality of terminals may compress each local model parameter and transmit the compressed local model parameter to the base station through a resource allocated to each terminal. That is, the plurality of terminals may transmit a local model parameter to the base station through resources that are allocated to each terminal but are not identical. Herein, the base station may decompress each compressed local model parameter and integrate each of decompressed local model parameters. Next, the base station may update a global parameter based on integrated information and transmit updated global parameter information to the plurality of terminals.

As another example, based on FIG. 33 and FIG. 34 described above, a base station itself may determine a transmission scheme. As an example, the base station may determine a transmission scheme based on multiple pieces of terminal information that are already stored. As an example, the multiple pieces of terminal information that are already store may include any one of terminal number information, communication environment information, terminal type information, and terminal ability information. As an example, based on Formula 5 described above, the base station may check the number of threshold terminals and determine a transmission scheme but is not limited to the above-described embodiment.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

What is claimed is:

1. A method for operating a base station in a wireless communication system, the method comprising:
    transmitting a synchronization signal to a plurality of terminals, wherein the synchronization signal includes a primary synchronization signal and a secondary synchronization signal;
    receiving a random access preamble from each of the plurality of terminals;
    transmitting a random access response as a response to the random access preamble to each of the plurality of terminals, wherein the random access response includes an uplink resource allocation assigned to a transmission of a scheduled message;
    transmitting a first global parameter to the plurality of terminals;
    determining a transmission scheme which is used by the plurality of terminals;
    transmitting the determined transmission scheme to the plurality of terminals;
    receiving, based on the determined transmission scheme, information on a local model parameter from the plurality of terminals; and
    updating the first global parameter to a second global parameter.

2. The method of claim 1, further comprising:
    requesting local model parameter compression size information to the plurality of terminals; and
    receiving the local model parameter compression size information from the plurality of terminals based on the request.

3. The method of claim 2, wherein the base station checks an aggregate total of local model parameter compression sizes for the plurality of terminals based on the local model parameter compression size information received from each of the plurality of terminals, and
    wherein the base station compares the aggregate total of local model parameter compression sizes for the plurality of terminals with a size based on AirComp.

4. The method of claim 3, wherein, based on the aggregate total of local model parameter compression sizes for the plurality of terminals being larger than the size based on AirComp, the base station determines an AirComp transmission scheme as a transmission scheme that is used by the plurality of terminals.

5. The method of claim 4, wherein, based on the plurality of terminals transmitting the local model parameter based on the AirComp transmission scheme, each of the plurality of terminals transmits the local model parameter to the base station at a same time slot.

6. The method of claim 5, wherein the base station identifies the local model parameter that is transmitted from each of the plurality of terminals based on a superposition scheme.

7. The method of claim 3, wherein, based on the aggregate total of local model parameter compression sizes for the plurality of terminals being equal to or smaller than the size based on AirComp, the base station determines a compression transmission scheme as a transmission scheme that is used by the plurality of terminals.

8. The method of claim 7, wherein, based on the plurality of terminals transmitting the local model parameter based on the compression transmission scheme, each of the plurality of terminals compresses the local model parameter, and
    wherein the each of the plurality of terminals transmits the compressed local model parameter to the base station through a resource that is allocated to the each of the plurality of terminals.

9. The method of claim 8, wherein the base station decompresses each of the compressed local model parameter and integrates each of the decompressed local model parameter, and
    wherein the base station updates the first global parameter to the second global parameter based on the integrated information.

10. The method of claim 1, wherein the base station determines the transmission scheme based on previously stored information on the plurality of terminals.

11. The method of claim 10, wherein the previously stored information on the plurality of terminals includes at least any one of information on a number of terminals, information on a communication environment, information on a terminal type, and information on a terminal ability.

12. The method of claim 10, wherein, based on the base station determining the transmission scheme based on the previously stored information on the plurality of terminals, the base station calculates information on a threshold number of terminals and determines the transmission scheme based on the calculated information on the threshold number of terminals.

13. A base station operating in a wireless communication system, the base station comprising:
    at least one transmitter;
    at least one receiver;
    at least one processor; and
    at least one memory that is coupled with the at least one processor in an operable manner and stores instructions which, when being executed, make the at least one processor perform a specific operation,
    wherein the specific operation is configured to:
    transmit a synchronization signal to a plurality of terminals, wherein the synchronization signal includes a primary synchronization signal and a secondary synchronization signal;
    receive a random access preamble from each of the plurality of terminals;
    transmit a random access response as a response to the random access preamble to each of the plurality of terminals, wherein the random access response includes an uplink resource allocation assigned to a transmission of a scheduled message;
    transmit a first global parameter to a plurality of terminals,
    determine a transmission scheme that is used by the plurality of terminals,
    transmit information on the determined transmission scheme to the plurality of terminals,
    receive information on a local model parameter from the plurality of terminals based on the determined transmission scheme, and
    update the first global parameter to a second global parameter.

14. A terminal operating in a wireless communication system, the terminal comprising:
    at least one transmitter;
    at least one receiver;
    at least one processor; and
    at least one memory that is coupled with the at least one processor in an operable manner and stores instructions which, when being executed, make the at least one processor perform a specific operation,
    wherein the specific operation is configured to:
    receive a synchronization signal from a base station, wherein the synchronization signal includes a primary synchronization signal and a secondary synchronization signal;
    transmit a random access preamble;
    transmit a random access response as a response to the random access preamble, wherein the random access response includes an uplink resource allocation assigned to a transmission of a scheduled message;
    receive a first global parameter from the base station;
    receive information on a determined transmission scheme from the base station; and
    transmit information on a local model parameter to the base station based on the determined transmission scheme,
    wherein the first global parameter is updated to a second global parameter.

* * * * *